US011269469B2

(12) United States Patent
Fujisawa et al.

(10) Patent No.: US 11,269,469 B2
(45) Date of Patent: Mar. 8, 2022

(54) DISPLAY DEVICE AND TOUCH PANEL

(71) Applicant: Japan Display Inc., Tokyo (JP)

(72) Inventors: Akihiko Fujisawa, Tokyo (JP); Teppei Yamada, Tokyo (JP); Kaoru Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/061,959

(22) Filed: Oct. 2, 2020

(65) Prior Publication Data
US 2021/0103361 A1 Apr. 8, 2021

(30) Foreign Application Priority Data

Oct. 3, 2019 (JP) .............................. JP2019-182744

(51) Int. Cl.
*G06F 3/044* (2006.01)
*G06F 3/041* (2006.01)
*G06K 9/00* (2022.01)

(52) U.S. Cl.
CPC .......... *G06F 3/0446* (2019.05); *G06F 3/0445* (2019.05); *G06F 3/0448* (2019.05); *G06F 3/04166* (2019.05); *G06K 9/0002* (2013.01)

(58) Field of Classification Search
CPC ... G06K 9/0002; G06F 3/0448; G06F 3/0446; G06F 3/0445; G06F 3/04166
See application file for complete search history.

(56) References Cited

U.S. PATENT DOCUMENTS

| 9,778,803 | B2* | 10/2017 | Sato ..................... G06F 1/1643 |
| 10,209,826 | B2 | 2/2019 | Ono et al. | |
| 10,838,532 | B2* | 11/2020 | Abe ...................... G06F 3/0416 |
| 11,004,926 | B2* | 5/2021 | Na ....................... H01L 51/5012 |
| 2017/0308200 | A1* | 10/2017 | Mugiraneza ...... G02F 1/134336 |
| 2018/0129106 | A1* | 5/2018 | Gao .................... G09G 3/3611 |
| 2018/0204889 | A1* | 7/2018 | Yu ....................... H01L 27/3223 |
| 2019/0304999 | A1* | 10/2019 | Wang .................. G06F 3/04164 |
| 2021/0064169 | A1* | 3/2021 | Kim .................... H01L 51/5246 |

FOREIGN PATENT DOCUMENTS

JP 2016206867 A 12/2016

* cited by examiner

*Primary Examiner* — Liliana Cerullo
(74) *Attorney, Agent, or Firm* — K&L Gates LLP

(57) ABSTRACT

A technology that can make the touch detection results at corner portions proper is proposed. A display device includes a display panel, a sensor substrate formed on the display panel, and plural drive electrodes and plural detection electrodes extended in a direction so as to intersect with the plural drive electrodes on the sensor substrate. Among the plural drive electrodes, any of the lengths of N first drive electrodes (where N represents the number), which are continuously adjacent to one another, is shorter than any of the lengths of the other drive electrodes. An area where at least one drive electrode among the N first drive electrodes and at least one detection electrode overlap each other is larger than the area of an intersectional portion where any of the other drive electrodes and any of the other detection electrodes overlap each other.

12 Claims, 22 Drawing Sheets

DISPLAY DEVICE AND TOUCH PANEL

CLAIM OF PRIORITY

The present application claims priority from Japanese Patent Application JP 2019-182744 filed on Oct. 3, 2019, the content of which is hereby incorporated by reference into this application.

BACKGROUND OF THE INVENTION

The present disclosure relates to display devices and touch panels, and more particularly can be applied to a display device having a display region with its corner portions cut or rounded, and to a touch panel having a sensor-active region with its corner portions cut or rounded.

There are cases where a touch detection function is provided in a display device used for a cellular phone. In addition, in a display device used in a recent cellular phone or the like, there are cases where a display panel having a display region with its four corner portions, that is, its upper left, upper right, lower left, and lower right corner portions cut or rounded is adopted. In this instance, in a similar way to the above display region, there are cases where the sensor-active region (also referred to as the active region hereinafter) of a touch panel formed on the display panel is shaped so that its four corner portions, that is, its upper left, upper right, lower left, and lower right corner portions are cut or rounded.

As a display device having a touch detection function, there is a display device proposed in Japanese Unexamined Patent Application Publication No. 2016-206867, for example.

SUMMARY OF THE INVENTION

In a display region or an active region with its four corner portions, that is, its upper left, upper right, lower left, and lower right corner portions cut or rounded, there are some cases where the sum of the areas of portions where drive electrodes and detection electrodes intersect (also referred to as an intersectional portion hereinafter) at a touch detection node (region) located in a corner portion becomes smaller than the sum of the areas of intersectional portions of drive electrodes and detection electrodes at a touch detection node located in a portion other than the corner portions. In this case, the sum of the capacitance values of mutual capacitors between drive electrodes and detection electrodes at the touch detection node located in the corner portion becomes smaller than the sum of the capacitance values of mutual capacitors between drive electrodes and detection electrodes at the touch detection node located in the portion other than the corner portions.

If the touch detection function of the entire display region of the display panel is optimized using, as a standard, the areas or mutual capacitors (also referred to as the detection capacitors) of the intersectional portions of drive electrodes and detection electrodes at a touch detection node, which does not reside in a corner portion, a touch detection result at a touch detection node in a corner portion exceeds a detection range, so that there are cases where the touch detection results at the corner portions become improper.

An object of the present disclosure is to propose a technology which can make the touch detection results at corner portions proper.

Problems other than the above and new features will be explicitly shown by the descriptions of this specification and the accompanying drawings.

The outline of a typical display device or a typical touch panel among display devices or touch panels according to this disclosure can briefly be described as follows.

To put it concretely, a display device according to one embodiment includes:
a display panel;
a sensor substrate formed on the display panel; and
a plurality of drive electrodes and a plurality of detection electrodes extended in a direction so as to intersect with the plurality of drive electrodes on the sensor substrate,
wherein among the plurality of drive electrodes, any of the lengths of N first drive electrodes (where N represents the number), which are continuously adjacent to one another, is shorter than any of the lengths of the other drive electrodes, and
an area where at least one drive electrode among the N first drive electrodes and at least one detection electrode overlap each other is larger than the area of an intersectional portion where any of the other drive electrodes and any of the other detection electrodes overlap each other.

Furthermore, a display device according to one embodiment includes:
a display panel;
a sensor substrate formed on the display panel; and
M drive electrodes (where M represents the number) and plural detection electrodes extended in a direction so as to intersect with the M drive electrodes on the sensor substrate,
wherein among the M drive electrodes, any of the lengths of N first drive electrodes (where N represents the number), which are continuously adjacent to one another, is shorter than any of the lengths of the other N second drive electrodes (where N represents the number) which are continuously adjacent to one another, and
the number of detection electrodes which intersect with the N first drive electrodes is larger than the number of detection electrodes which intersect with the N second drive electrodes.

In addition, a touch panel according to one embodiment includes:
a sensor substrate; and
plural of drive electrodes and plural detection electrodes extended in a direction so as to intersect with the plural drive electrodes on the sensor substrate,
wherein among the plural of drive electrodes, any of the lengths of N first drive electrodes (where N represents the number), which are continuously adjacent to one another, is shorter than any of the lengths of the other drive electrodes, and an area where at least one drive electrode among the N first drive electrodes and at least one detection electrode (Rx1$a$) overlap each other is larger than the area of an intersectional portion where any other drive electrode and any other detection electrode overlap each other.

DETAILED DESCRIPTION OF THE PREFERRED EMBODIMENTS

Figure 1:
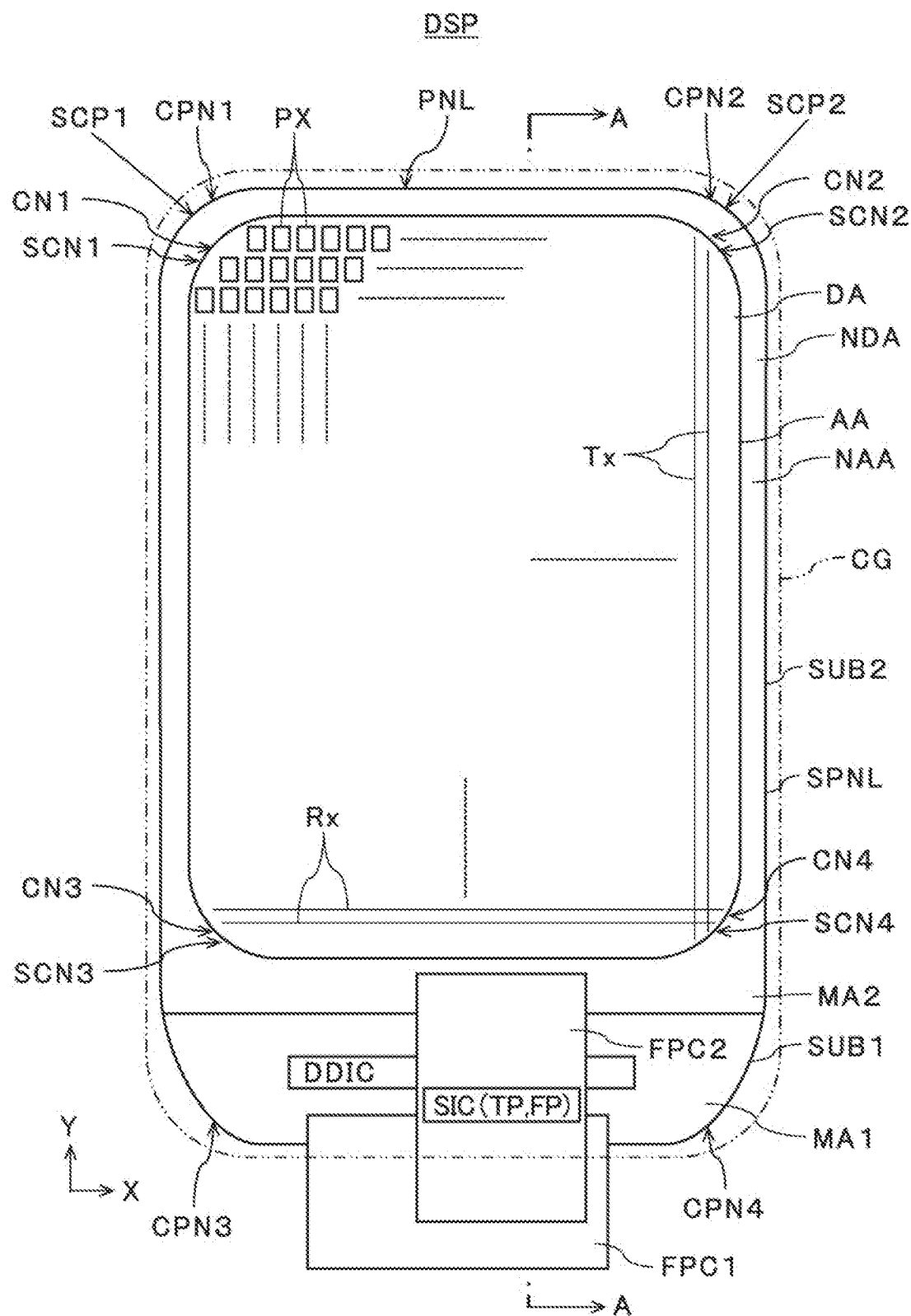
FIG. 1 is a plan view conceptually showing the external view of a display device according to a first embodiment.

Hereinafter, respective embodiments according to the present invention will be explained with reference to the accompanying drawings.

Here, it should be understood that the embodiments of the present disclosure are only examples, and alternations of the embodiments that can be easily come up with by those skilled in the art within the gist of the present invention naturally fall within the scope of the present invention. Furthermore, there are some cases where, in the accompanying drawings, the widths, thicknesses, shapes, and the like of respective portions of the embodiments are schematically depicted differently from what the embodiments really are, but these depictions are only examples, so that the interpretation of the present invention is not limited to these depictions.

In addition, in this specification and the accompanying drawings, the same components as components that have appeared in already-described drawings are given the same reference signs, and detailed explanation about them may be omitted accordingly.

In the following embodiments, as an example of a display device, a liquid crystal display device will be disclosed. This liquid crystal display device can be used for various devices such as a smart phone, a tablet terminal, a cellular phone; a personal computer, a TV receiver, an in-vehicle device; a game machine, for example.

Here, in the scope of the present specification and the appended claims, a term such as "upper", "lower", or the like represents the relative positional relation of a targeted structure to another structure. To put it concretely, when the side of the targeted structure is looked at, a direction from a first substrate (an array substrate) to a second substrate (an opposite substrate) is defined as an "upper" direction and an opposite direction thereto is defined as a "lower" direction.

Furthermore, terms such as "inner" and "outer" represent relative positional relations of two portions on the basis of a display region. In other words, an 'inner" portion indicates one portion nearer to the display region than the other portion, and an "outer" portion indicates one portion farther from the display region than the other portion. Here, the definitions of the terms "inner" and "outer" should be made under the condition that the relevant liquid crystal display device is not folded into two.

A "display device" indicates a general display device that displays videos using a display panel. The "display panel" indicates a structure that displays videos using an electrooptic layer. For example, a term "display panel" indicates a display cell including an electrooptic layer in some cases, or indicates a structure in which other optical materials (for example, a polarizing material, a backlight, a touch panel, and the like) are mounted in other cases instead of the display cell. Here, the "electrooptic layer" can include a liquid crystal layer, an electrochromic (EC) layer, an organic EL, a micro LED, and the like as long as any technological problem does not occur. Therefore, just because a liquid crystal panel including a liquid crystal layer will be explained as an example of a display panel in the aftermentioned embodiments, does not mean that these embodiments are not applicable to a display panel including any of the abovementioned electrooptic layer other than the liquid crystal layer.

First Embodiment (Entire Configuration Example of Display Device)

FIG. 1 is a plan view conceptually showing the external view of a display device according to a first embodiment. A display device DSP includes a cover glass CG, a display panel PNL, a sensor panel SPNL, a flexible printed circuit substrate FPC1, a display drive IC chip DDIC, a flexible printed circuit substrate FPC2, and a sensor IC chip SIC. The sensor panel SPNL can be renamed to a touch panel.

The display panel PNL includes a first substrate (also referred to as an array substrate) SUB1, a second substrate (also referred to as an opposite substrate) SUB2, an aftermentioned liquid crystal layer LC, and an after-mentioned seal member SE. The second substrate SUB2 faces the first substrate SUB1. The first substrate SUB1 includes a mounting section MA1 that is extending to the second direction Y more extensively than the second substrate SUB2 is. The seal member SE is located in a nondisplay section NDA and seals the liquid crystal layer LC while bonding the first substrate SUB1 and the second substrate SUB2 together. It is conceivable that a lower polarizing plate and a backlight device are mounted under the first substrate SUB1.

The mounting section MA1 is connected to one end of the flexible printed circuit substrate FPC1, and a printed circuit substrate (not shown), on which a host device is mounted, is connected to the other end of the flexible printed circuit substrate FPC1. In this example, the display drive IC chip DDIC is mounted on the mounting section MA1. It is also conceivable that the display drive IC chip DDIC is mounted on the flexible printed circuit substrate FPC1. The display drive IC chip DDIC outputs a signal necessary for displaying videos in a display mode for displaying videos to the display panel PNL.

One end of the flexible printed circuit substrate FPC2 is connected to a mounting section MA2 of the sensor panel SPNL. In this example, the sensor IC chip SIC is mounted on the flexible printed circuit substrate FPC2. It is also conceivable that the sensor IC chip SIC is mounted on the mounting section MA2 of the sensor panel SPNL. The sensor IC chip SIC outputs a drive signal necessary for detection in a sensor mode to the sensor panel SPNL, and continuously receives a detected signal from the sensor panel SPNL.

The display panel PNL includes a display section (display region) DA for displaying videos, and the nondisplay section (nondisplay region or peripheral region) NDA that is formed in a frame shape surrounding the display section DA. The display section DA includes plural pixels PX that are disposed both in the first direction X and in the second direction Y which is perpendicular to the first direction X, that is, in a matrix shape. The four corner portions CN1, CN2, CN3, and CN4, that is, the upper left, upper right, lower left, and lower right corner portions of the display section DA are formed in cut shapes or in round (circular arc) shapes in a plane view. The upper two corner portions CPN1 and CPN2, that is, the upper left and upper right corner portions of the display panel PNL are formed in cut shapes or in round shapes in a plane view as is the case with the corner portions CN1 and CN2 of the display section DA. The lower two corner portions CPN3 and CPN4, that is, the lower left and lower right corner portions of the display panel PNL are formed in cut shapes or in round shapes in a plane view.

The sensor panel SPNL includes a sensor-active region (also referred to an active region hereinafter) AA that is formed so as to overlap the display section DA for displaying videos, and a nonactive region NAA that is formed in a frame shape surrounding the active region AA. The active region AA includes plural detection electrodes Rx each of which is extending in the first direction X while the respective plural detection electrodes Rx are disposed in the second direction Y which is perpendicular to the first direction X, and plural drive electrodes Tx each of which is extending in the second direction Y while the respective plural drive electrodes Tx are disposed in the first direction X which is perpendicular to the second direction Y. The four corner portions SCN1, SCN2, SCN3, and SCN4, that is, the upper left, upper right, lower left, and lower right corner portions of the active region AA are formed in cut shapes or in round shapes in a plane view as is the case with the four corner portions CN1, CN2, CN3, and CN4 of the display section DA. In addition, the upper two corner portions SCP1 and SCP2, that is, the upper left and upper right corner portions of the sensor panel SPNL are formed in cut shapes or in round shapes in a plane view as is the case with the two corner portions CN1 and CN2, that is, the upper left and upper right corner portions of the display panel PNL.

The cover glass CG is formed so as to cover the display panel PNL and the sensor panel SPNL. The cover glass CG can be made, for example, by a transparent glass material or the like. The four corner portions, that is, the upper left, upper right, lower left, and lower right corner portions of the cover glass CG are formed in cut shapes or in round shapes in a plane view as is the case with the display panel PNL.

The display pane PNL according to this embodiment can be any of a transmission type display panel having a transmission display function to display videos by selectively transmitting lights from the backside of the first substrate SUB1, a reflection type display panel having a reflection display function to display videos by selectively reflecting lights from the frontside of the second substrate SUB2, and a semi-transmission type display panel having both transmission display function and reflection display function.

The display panel PNL can include a configuration compatible with any of a display mode using a longitudinal electric field along the normal line of the main surface of the substrate, a display mode using an oblique electric field that is tilted in an oblique direction to the main surface of the substrate, and a display mode using an appropriate combination of the abovementioned longitudinal electric field and oblique electric field.

(Circuit Configuration Example of Display Device)

Figure 2:
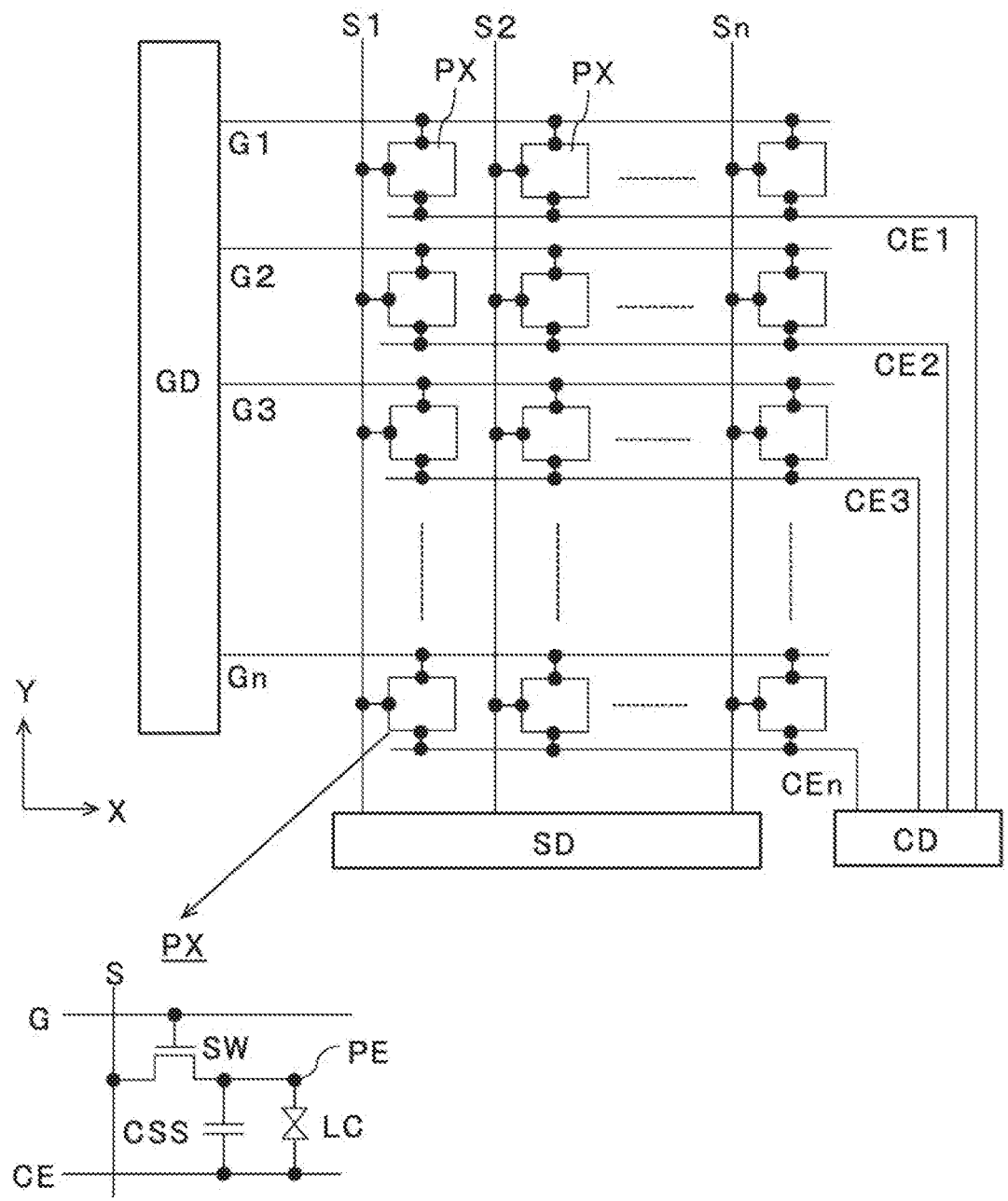
FIG. 2 is a diagram showing the basic configuration of a pixel and an equivalent circuit of a display panel.

FIG. 2 is a diagram showing the basic configuration of a pixel PX and an equivalent circuit of the display panel. Plural pixels PX are disposed both in the first direction X and in the second direction Y, that is, in a matrix shape. Plural scanning lines G (G1, G2, . . . ) are electrically connected to a scanning line drive circuit GD. Plural signal lines S(S1, S2, . . . ) are electrically connected to a signal line drive circuit SD. Plural common electrodes CE (CE1, CE2, . . . ) are electrically connected to the voltage supply unit CD of a common voltage (Vcom) and supplied to the plural pixels PX. One pixel PX is electrically connected to one scanning line, one signal line, and one common electrode CE. Here, it is not always necessary that the scanning lines G and the signal lines S are linearly extending, and parts of these lines may be bent. For example, even if parts of the signal lines S are bent, it will be assumed that the signal lines S are extending in the second direction Y as a whole.

Each pixel PX includes a switching element SW, a pixel electrode PE, a common electrode CE, a liquid crystal layer LC, and the like. The switching element SW is formed by, for example, a thin film transistor (TFT), and electrically connected to a scanning line G and a signal line S. The scanning line G is electrically connected to the switching element SW of each pixel PX arranged in the first direction X. The signal line S is electrically connected to the switching element SW of each pixel PX arranged in the second direction Y. The pixel electrode PE is electrically connected to the switching element SW. Each pixel electrode PE faces the common electrode CE and drives a liquid crystal layer LC using an electric field induced between each pixel electrode PE itself and the common electrode CE. A retention capacitor CSS is formed between, for example, an electrode the potential of which is the same as that of the common electrode CE and an electrode the potential of which is the same as that of the pixel electrode PE.

(Cross Section Configuration Example of Display Device)

Figure 3:
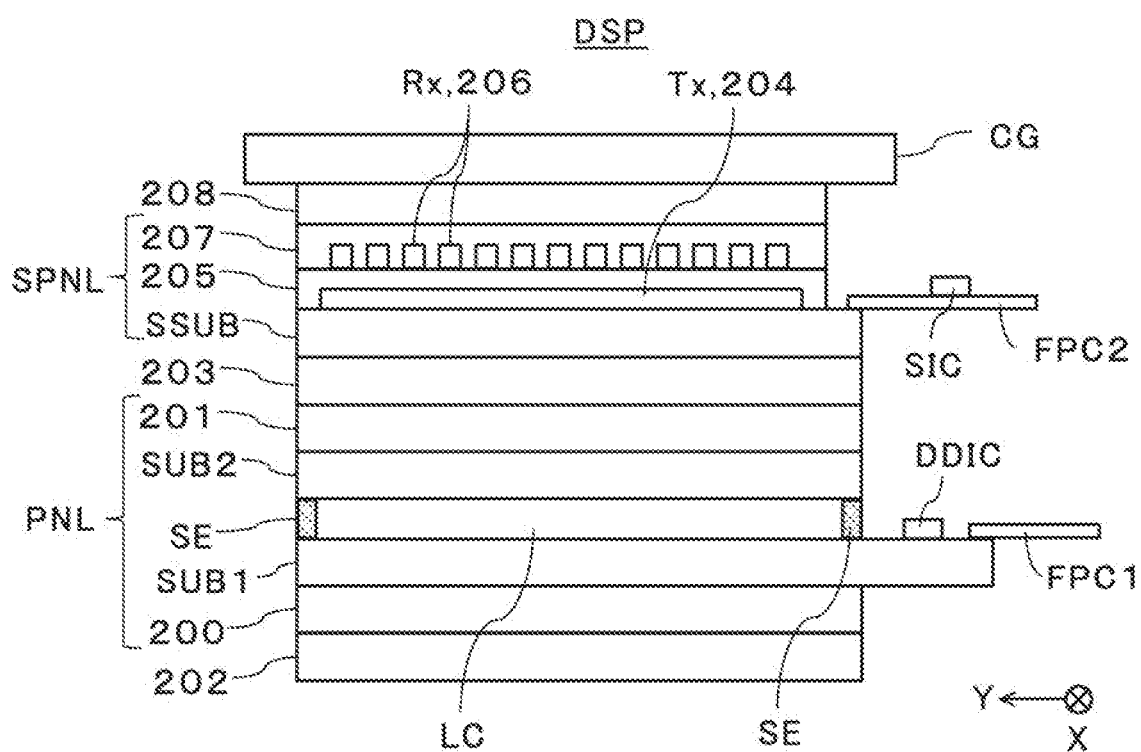
FIG. 3 is a diagram conceptually showing the cross-sectional view of the display device taken along the line A-A of FIG. 1.

FIG. 3 is a diagram conceptually showing the cross-sectional view of the display device taken along the line A-A of FIG. 1. A lower polarizing plate 200 is bonded to the lower surface of the first substrate SUB1, and an upper polarizing plate 201 is bonded to the upper surface of the second substrate SUB2. The seal member SE is located in the nondisplay section NDA and seals the liquid crystal layer LC while bonding the first substrate SUB1 and the second substrate SUB2 together. A combination of the first substrate SUB1, the second substrate SUB2, the lower polarizing plate 200, the upper polarizing plate 201, the seal member SE, and the liquid crystal layer LC is referred to as the display panel PNL. Because the display panel PNL itself does not emit light, a backlight 202 is disposed under the lower polarizing plate 200 on the backside of the display panel PNL.

The lower surface of the sensor substrate SSUB is bonded to the upper surface of the upper polarizing plate 201 with a bonding layer 203 therebetween. A drive electrode Tx, which is made of a first metal wire layer 204, is formed on the upper surface of the sensor substrate SSUB, and a first insulating film 205 is formed so as to cover the drive electrode Tx. Plural detection electrodes Rx, which are made of second metal wire layers 206, are formed on the upper surface of the first insulating film 205, and a second insulating film 207 is formed so as to cover the plural detection electrodes Rx. The cover glass CG is bonded to the upper surface of the second insulating film 207 with a bonding layer 208 therebetween. A combination of the sensor substrate SSUB, the drive electrode Tx, the first insulating film 205, the detection electrodes Rx, and the second insulating film 207 is referred to as the sensor panel SPNL.

The first metal wire layer 204 and the second metal wire layer 206 can be made of a transparent material such as ITO (Indium Tin Oxide) or IZO (Indium Zinc Oxide), for example. The first insulating film 205 and the second insulating film 207 can be made of an organic insulating film formed by an organic insulating material such as acrylate resin. Furthermore, the second insulating film 207 can be made of an inorganic insulating film formed by an inorganic insulating material such as silicon oxide, silicon nitride, or silicon oxynitride.

Next, a typical configuration example of the sensor panel SPNL will be explained.

(Typical Configuration Example of Touch Detection Node)

Figure 4:
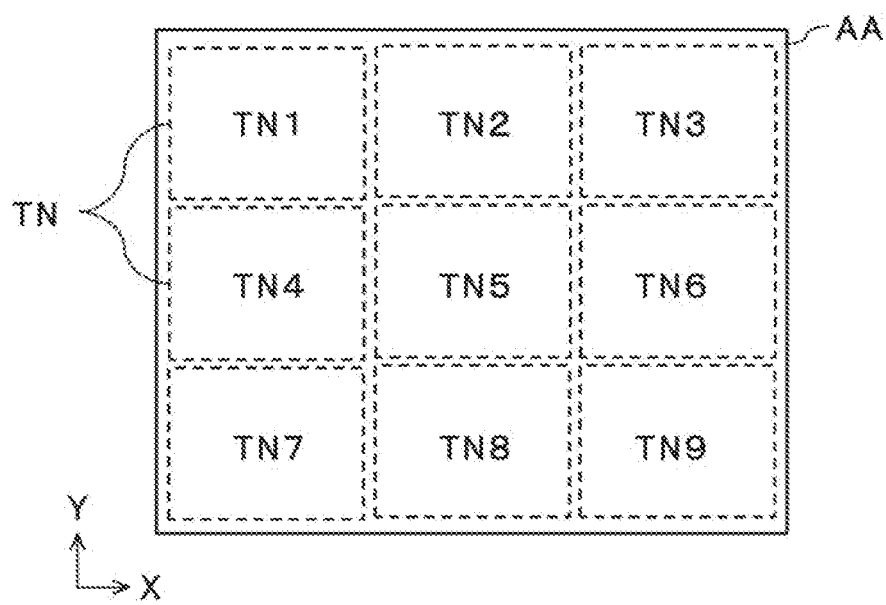
FIG. 4 is a diagram for explaining the touch detection nodes of a sensor panel.

FIG. 4 is a diagram for explaining the touch detection nodes of a sensor panel. In this example, a case where the sensor panel SPNL and the active region AA have rectangular shapes will be explained as typical examples. As shown in FIG. 4, the sensor panel SPNL includes the active region AA of a rectangular shape in a plane view, and it will be assumed that plural touch detection nodes (regions) TN, which are formed both in the first direction X and the second direction Y, that is, in a matrix shape, are virtually prepared in the active region AA. FIG. 4 shows nine touch detection nodes (regions) TN1 to TN9 by way of example. It will be assumed that, in this example, each of the touch detection nodes (regions) TN1 to TN9 is of a rectangular shape.

(Typical Configuration Example of Touch Position Detection Circuit)

Figure 5:
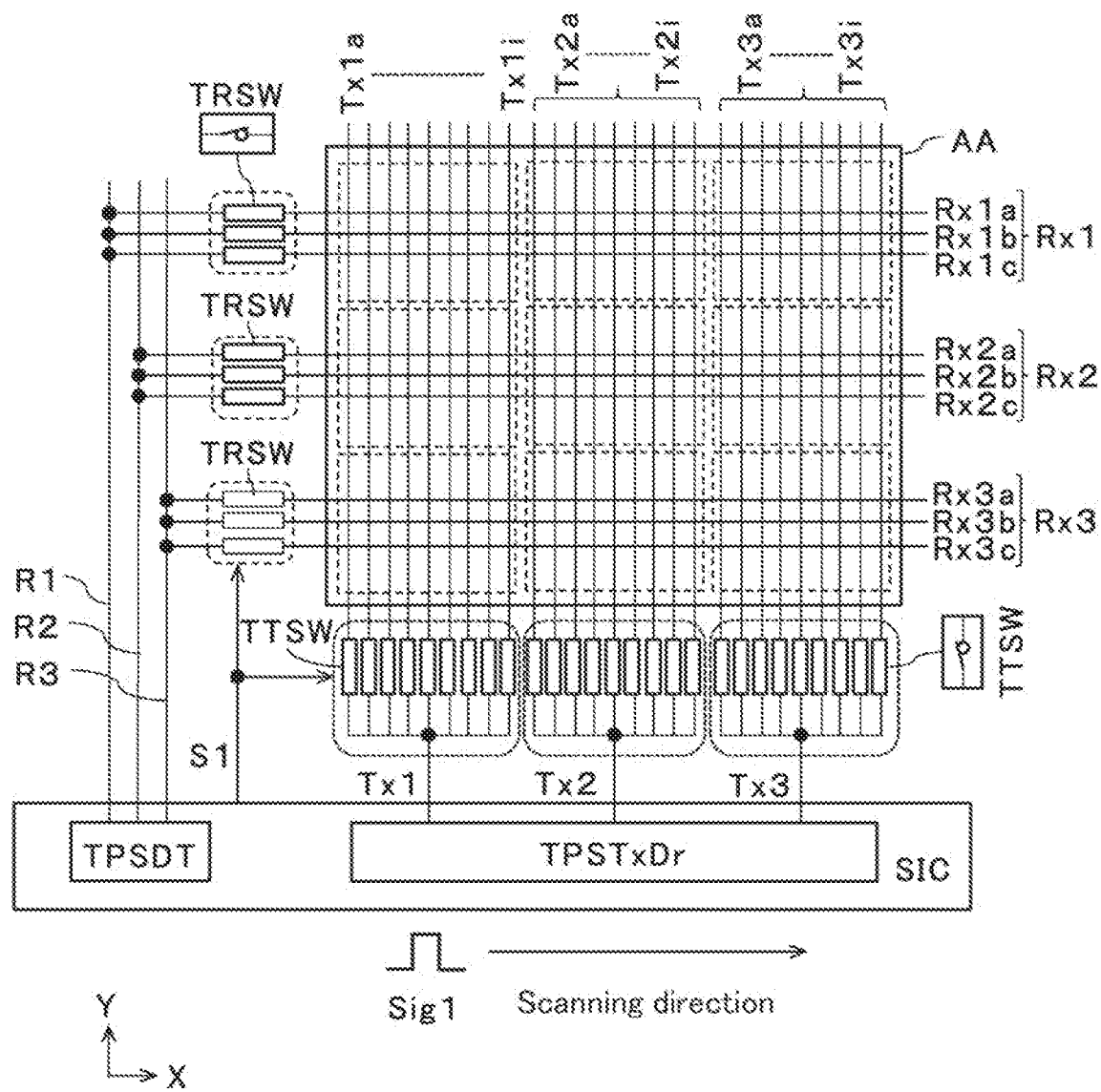
FIG. 5 is a diagram showing a typical configuration example of a touch position detection circuit.

FIG. 5 is a diagram showing a typical configuration example of a touch position detection circuit. FIG. 5 shows a case where plural drive electrodes Tx and plural detection electrodes Rx are installed at the touch detection nodes TN1 to TN9 shown in FIG. 4. Here, although the reference signs of the touch detection nodes TN1 to TN9 shown in FIG. 4 are not depicted in FIG. 5 for avoiding the complexity of FIG. 5, the following explanations will be made using the reference signs of the touch detection nodes TN1 to TN9 shown in FIG. 4.

The touch detection nodes TN1, TN2, and TN3 are provided with L detection electrodes (where L represents the number) that are extending in the first direction X. As an example, the touch detection nodes TN1, TN2, and TN3 are provided with three detection electrodes Rx1a, Rx1b, and Rx1c. The three detection electrodes Rx1a, Rx1b, and Rx1c are bundled by three switch elements TRSW installed outside of the active region AA, and the three detection electrodes are electrically connected to a lead wire R1. In other words, at the time of touch position detection, the three detection electrodes Rx1a, Rx1b, and Rx1c are bundled by the three switch elements TRSW which are in an on-state, and the three detection electrodes function as one detection electrode Rx1.

The touch detection nodes TN4, TN5, and TN6 are provided with L detection electrodes (where L represents the number) that are extending in the first direction X. As an example, the touch detection nodes TN4, TN5, and TN6 are provided with three detection electrodes Rx2a, Rx2b, and Rx2c. The detection electrodes Rx2a, Rx2b, and Rx2c are bundled by three switch elements TRSW installed outside of the active region AA, and the three detection electrodes are electrically connected to a lead wire R2. In other words, at the time of touch position detection, the three detection electrodes Rx2a, Rx2b, and Rx2c are bundled by the three switch elements TRSW which are in an on-state, and the three detection electrodes function as one detection electrode Rx2.

The touch detection nodes TN7, TN8, and TN9 are provided with L detection electrodes (where L represents the number) that are extending in the first direction X. As an example, the touch detection nodes TN7, TN8, and TN9 are provided with three detection electrodes Rx3a, Rx3b, and Rx3c. The detection electrodes Rx3a, Rx3b, and Rx3c are bundled by three switch elements TRSW installed outside of the active region AA, and the three detection electrodes are electrically connected to a lead wire R3. In other words, at the time of touch position detection, the three detection electrodes Rx3a, Rx3b, and Rx3c are bundled by the three switch elements TRSW which are in an on-state, and the three detection electrodes function as one detection electrode Rx3.

The touch detection nodes TN1, TN4, and TN7 are provided with N drive electrodes (where N represents the number) that are extending in the second direction Y. As an example, the touch detection nodes TN1, TN4, and TN7 are provided with nine drive electrodes Tx1a to Tx1i. The drive electrodes Tx1a to Tx1i are bundled by nine switch elements TTSW installed outside of the active region AA, and the nine drive electrodes are treated as one drive electrode Tx1. In other words, at the time of touch position detection, the nine drive electrodes Tx1a to Tx1i are bundled by the nine switch elements TTSW which are in an on-state, and the nine drive electrodes function as one drive electrode Tx1.

The touch detection nodes TN2, TN5, and TN8 are provided with N drive electrodes (where N represents the number) that are extending in the second direction Y. As an example, the touch detection nodes TN2, TN5, and TN8 are provided with nine drive electrodes Tx2a to Tx2i. The drive electrodes Tx2a to Tx2i are bundled by nine switch elements TTSW installed outside of the active region AA, and the nine drive electrodes are treated as one drive electrode Tx2. In other words, at the time of touch position detection, the nine drive electrodes Tx2a to Tx2i are bundled by the nine switch elements TTSW which are in an on-state, and the nine drive electrodes function as one drive electrode Tx2.

The touch detection nodes TN3, TN6, and TN9 are provided with N drive electrodes (where N represents the number) that are extending in the second direction Y. As an example, the touch detection nodes TN3, TN6, and TN9 are provided with nine drive electrodes Tx3a to Tx3i. The drive electrodes Tx3a to Tx3i are bundled by nine switch elements TTSW installed outside of the active region AA, and the nine drive electrodes are treated as one drive electrode Tx3. In other words, at the time of touch position detection, the nine drive electrodes Tx3a to Tx3i are bundled by the nine switch elements TTSW which are in an on-state, and the nine drive electrodes function as one drive electrode Tx3.

The drive electrodes Tx1 to Tx3 are electrically connected to a drive circuit TPSTxDr of the sensor IC chip SIC used for touch position detection. In addition, the lead wires R1, R2, and R3 are electrically connected to a detection circuit TPSDT for touch position detection.

The on-state and off-state of each of the switch elements TRSW and TTSW are controlled by the switch signal S1 output from the sensor IC chip SIC. For example, each of the switch elements TRSW and TTSW is set in an on-state at the time of touch position detection by the high level of the switch signal S1, and set in an off-state at the times of behaviors other than the time of touch position detection by the low level of the switch signal S1. Each of the switch elements TRSW and TTSW can be made of, for example, a thin film transistor (TFT).

Next, the behavior of the touch position detection circuit at the time of touch position detection will be explained. In this embodiment, although a mutual-detection scheme will be explained as an example of the touch position detection scheme, a self-detection scheme can also be used.

The drive electrodes Tx1 to Tx3 and the detection electrodes Rx1 to Rx3 are disposed with a predetermined space therebetween owing to the film thickness of the first insulating film 205 as shown in FIG. 3. Therefore, mutual capacitors (electrostatic capacitors) essentially exist between the drive electrodes Tx1 to Tx3 and the detection electrodes Rx1 to Rx3.

In the mutual detection scheme, the drive electrodes Tx1 to Tx3 are scanned with a drive pulse Sig1 having a predetermined cycle by the drive circuit TPSTxDr. Now, it will be assumed that a finger of a user exists near to the intersectional portion of the detection electrode Rx2 and the drive electrode Tx2 (the intersectional portion is corresponding to the touch detection node TN5). If the drive electrode Tx2 is provided with the drive pulse Sig1 at this time, a pulse waveform is obtained at the detection electrode Rx2, and a detection pulse, the magnitude level of which is lower than that of a detection pulse obtained from the detection electrode Rx1 or Rx3, is obtained from the detection Rx2. The detection electrodes Rx1, Rx2, and Rx3 monitor fringe electric fields from the drive electrodes Tx1, Tx2, and Tx3, and if a conductive object such as a finger approaches one of the touch detection nodes, this conductive object brings about an effect to shield the relevant fringe electric field. Shielding the relevant fringe electric field causes the detection potential of the relevant detection electrode Rx to be lowered. Using an electrode drive timing by the drive pulse Sig and the output timings of detection pulses, it becomes possible to detect the two-dimensional position of the finger on the plane of the active region AA of the sensor panel SPNL.

A mutual capacitor (electrostatic capacitor) at each of the touch detection nodes TN1 to TN9 will be explained hereinafter. As shown in FIG. 5, three detection electrodes (Rxna, Rxnb, Rxnc, where n=1, 2, or 3) and nine drive electrodes (Txna to Txni, where n=1, 2, or 3) intersect with one another at each of the touch detection nodes TN1 to TN9. The areas of the intersectional portions of the three detection electrodes (Rxna, Rxnb, Rxnc, where n=1, 2, or 3) and the nine drive electrodes (Txna to Txni, where n=1, 2, or 3) dominantly decide the capacitance values of the relevant mutual capacitors respectively. Therefore, it is conceivable that each of the touch detection nodes TN1 to TN9 shown in FIG. 5 has a mutual capacitor of the same capacitance value substantially.

(Typical Configuration Example of Fingerprint Detection Circuit)

Figure 6:
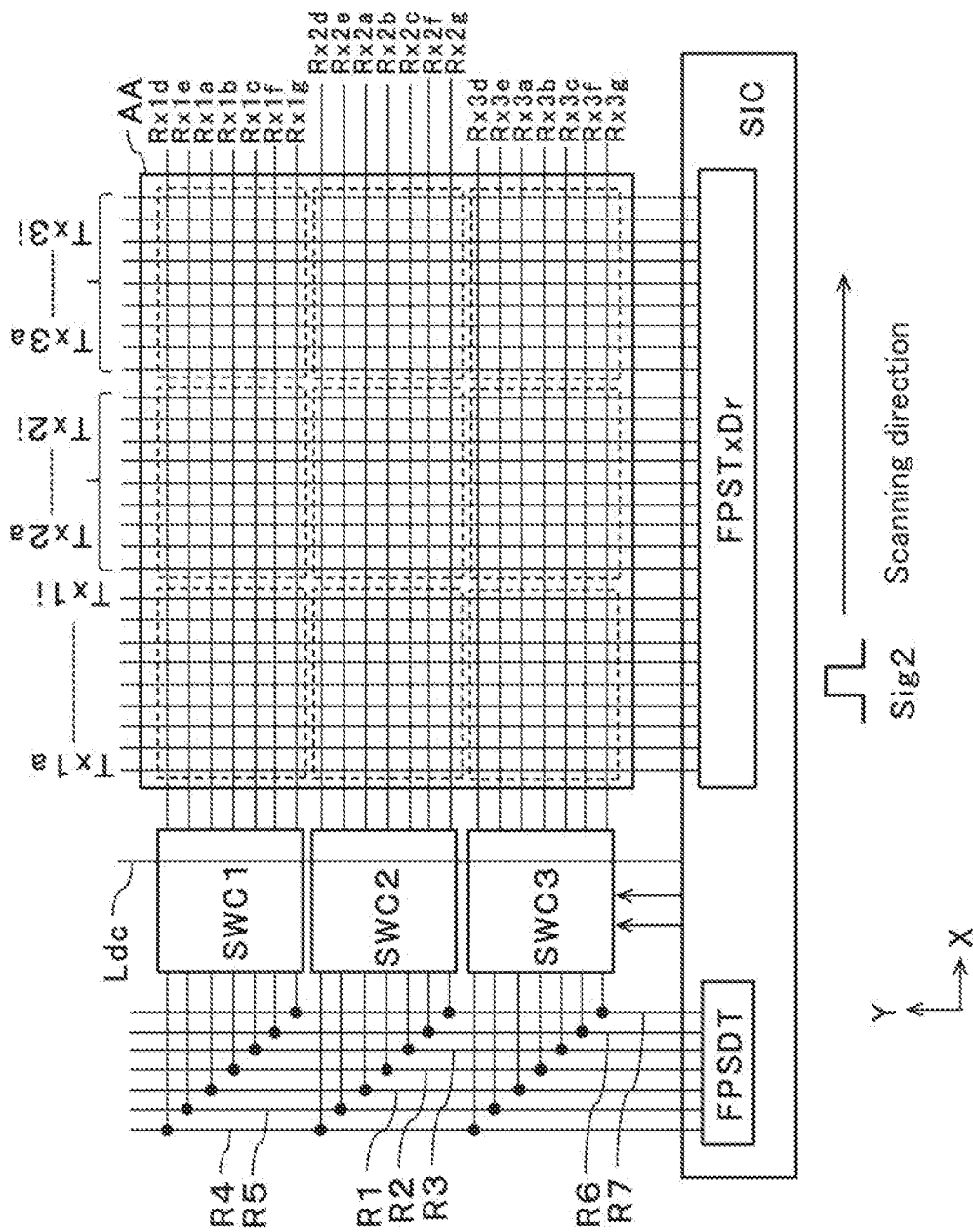
FIG. 6 is a diagram showing a typical configuration example of a fingerprint detection circuit.
Figure 7:
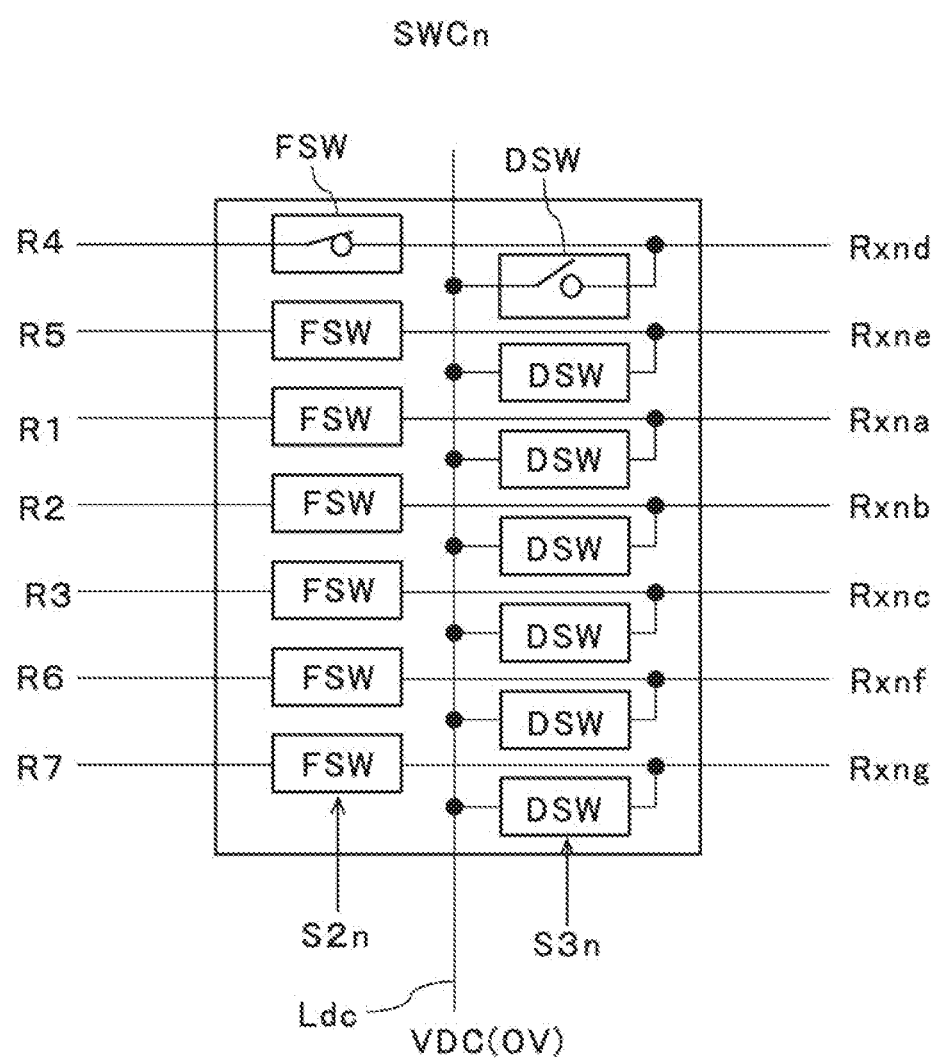
FIG. 7 is a diagram showing a configuration example of a switch circuit shown in FIG. 6.

FIG. 6 is a diagram showing a typical configuration example of a fingerprint detection circuit. FIG. 7 is a diagram showing a configuration example of a switch circuit shown in FIG. 6. FIG. 6 shows a state in which the touch detection nodes TN1 to TN9 shown in FIG. 4 are provided with plural drive electrodes Tx and plural detection electrodes Rx. Here, in order to avoid the complexity of FIG. 6, the reference signs of the touch detection nodes TN1 to TN9 shown in FIG. 4 are not depicted in FIG. 6, the reference signs of the touch detection nodes TN1 to TN9 shown in FIG. 4 will be used in the following explanations.

The touch detection nodes TN1, TN2, and TN3 are provided with H detection electrodes (where H represents the number) extending in the first direction X. As an example, the touch detection nodes TN1, TN2, and TN3 are provided with not only the three detection electrodes Rx1a, Rx1b, and Rx1c, which are described in FIG. 5, but also four detection electrodes Rx1d, Rx1e, Rx1f, and Rx1g. The seven detection electrodes Rx1a to Rx1g are electrically connected to a switch circuit SWC1 mounted outside of the active region AA. The switch circuit SWC1 is electrically connected to seven lead wires R1 to R7 formed outside of the active region AA.

The touch detection nodes TN4, TN5, and TN6 are provided with H (where H represents the number) detection electrodes extending in the first direction X. As an example, the touch detection nodes TN4, TN5, and TN6 are provided with not only the three detection electrodes Rx2a, Rx2b, and Rx2c, which are described in FIG. 5, but also four detection electrodes Rx2d, Rx2e, Rx2f, and Rx2g. The seven detection electrodes Rx2a to Rx2g are electrically connected to a switch circuit SWC2 mounted outside of the active region AA. The switch circuit SWC2 is electrically connected to the seven lead wires R1 to R7 formed outside of the active region AA.

The touch detection nodes TN7, TN8, and TN9 are provided with H detection electrodes (where H represents the number) extending in the first direction X. As an example, the touch detection nodes TN4, TN5, and TN6 are provided with not only the three detection electrodes Rx3a, Rx3b, and Rx3c, which are described in FIG. 5, but also four detection electrodes Rx3d, Rx3e, Rx3f, and Rx3g. The seven detection electrodes Rx3a to Rx3g are electrically connected to a switch circuit SWC3 mounted outside of the active region AA. The switch circuit SWC3 is electrically connected to the seven lead wires R1 to R7 formed outside of the active region AA.

The touch detection nodes TN1, TN4, and TN7 are provided with N detection electrodes (where N represents the number) extending in the second direction Y. As an example, the touch detection nodes TN1, TN4, and TN7 are provided with nine drive electrodes Tx1a to Tx1i. The touch detection nodes TN2, TN5, and TN8 are provided with N detection electrodes (where N represents the number) extending in the second direction Y. As an example, the touch detection nodes TN2, TN5, and TN8 are provided with nine drive electrodes Tx2a to Tx2i. The touch detection nodes TN3, TN6, and TN9 are provided with N detection electrodes (where N represents the number) extending in the second direction Y. As an example, the touch detection nodes TN3, TN6, and TN9 are provided with nine drive electrodes Tx3a to Tx3i.

The nine drive electrodes Tx1a to Tx1i, the nine drive electrodes Tx2a to Tx2i, and the nine drive electrodes Tx3a to Tx3i are electrically connected to a drive circuit FPSTxDr of the sensor IC chip SIC used for fingerprint detection. Furthermore, the seven lead wires R1 to R7 are electrically connected to a detection circuit FPSDT of the sensor IC chip SIC used for fingerprint detection.

As shown in FIG. 6, it becomes possible to accurately detect fine concavities and convexities such as a fingerprint or the like by making the number of detection electrodes in FIG. 6 larger than that in FIG. 5.

As shown in FIG. 7, a switch circuit (SWCn, where n=1, 2, or 3) includes H switch elements FSW and H switch elements DSW (where H represents the number). As an example, the switch circuit includes seven switch elements FSW and seven switch elements DSW. Each of the switch elements FSW and DSW can be made of, for example, a thin film transistor (TFT).

The seven switch elements FSW are formed between seven detection electrodes (Rxna to Rxng, where n=1, 2, or 3) and the seven lead wires R1 to R7. The seven switch elements FSW are controlled so as to be set in an on-state or in an off-state by a switch signal S2n output from the sensor IC chip SIC. For example, the seven switch elements FSW are set in an on-state by the high level of the switch signal S2n and set in an off-state by the low level of the switch signal S2n. When the seven switch elements FSW are in an on-state, the seven detection electrodes (Rxna to Rxng, where n=1, 2, or 3) are electrically connected to the seven lead wires R1 to R7 respectively.

The seven switch elements DSW are formed between the seven detection electrodes (Rxna to Rxng, where n=1, 2, or 3) and a wire Ldc. The wirer Ldc is provided with a predetermined DC potential VDC such as the ground potential (0 V). The on-state and off-state of each of the seven switch elements DSW are controlled by a switch signal S3n. For example, the seven switch elements DSW are set in an on-state by the high level of the switch signal S3n and set in an off-state by the low level of the switch signal S3n. When the seven switch elements DSW are in an on-state, the seven detection electrodes (Rxna to Rxng, where n=1, 2, or 3) are set at the DC potential VDC.

Next, the behavior of the fingerprint detection circuit at the time of fingerprint detection will be explained.

At the time of fingerprint detection, the fingerprint detection is executed at the touch detection nodes TN1, TN2, and TN3 first, the fingerprint detection is executed at the touch detection nodes TN4, TN5, and TN6 next, and the fingerprint detection is executed at the touch detection nodes TN7, TN8, and TN9 finally.

When the fingerprint detection is executed at the touch detection nodes TN1, TN2, and TN3, each switch element FSW of the switch circuit SWC1 is set in an on-state, and each switch element DSW of the switch circuit SWC1 is set in an off-state. In this case, each switch element FSW of the switch circuits SWC2 and SWC3 is set in an off-state, and each switch element DSW of the switch circuits SWC2 and SWC3 is set in an on-state. In other words, detection electrodes unnecessary for the fingerprint detection this time (Rxna to Rxng, where n=2 or 3), are set at the DC potential VDC. In the above condition, each of the drive electrodes Tx1a to Tx1i, Tx2a to Tx2i, and Tx3a to Tx3i is sequentially driven (scanned) with the drive pulse Sig2 having a predetermined cycle by the drive circuit FPSTxDr of the sensor IC chip SIC used for fingerprint detection. Consequently, detected signals are output from the detection electrodes Rx1a to Rx1g to the lead wires R1 to R7 respectively and the detected signals are input into the detection circuit FPSDT.

Next, the fingerprint detection at the touch detection nodes TN4, TN5, and TN6 is executed. When the fingerprint detection is executed at the touch detection nodes TN4, TN5, and TN6, each switch element FSW of the switch circuit SWC2 is set in an on-state, and each switch element DSW of the switch circuit SWC2 is set in an off-state. In this case, each switch element FSW of the switch circuits SWC1 and SWC3 is set in an off-state, and each switch element DSW of the switch circuits SWC1 and SWC3 is set in an on-state. Detection electrodes unnecessary for the fingerprint detection this time (Rxna to Rxng, where n=1 or 3), are set at the DC potential VDC. In the above condition, each of the drive electrodes Tx1a to Tx1i, Tx2a to Tx2i, and Tx3a to Tx3i is sequentially driven (scanned) with the drive pulse Sig2 having a predetermined cycle by the drive circuit FPSTxDr of the sensor IC chip SIC used for fingerprint detection. Consequently, detected signals are output from the detection electrodes Rx2a to Rx2g to the lead wires R1 to R7 respectively and the detected signals are input into the detection circuit FPSDT.

Next, the fingerprint detection at the touch detection nodes TN7, TN8, and TN9 is executed. When the fingerprint detection is executed at the touch detection nodes TN7, TN8, and TN9, each switch element FSW of the switch circuit SWC3 is set in an on-state, and each switch element DSW of the switch circuit SWC3 is set in an off-state. In this case, each switch element FSW of the switch circuits SWC1 and SWC2 is set in an off-state, and each switch element DSW of the switch circuits SWC1 and SWC2 is set in an on-state. Detection electrodes unnecessary for the fingerprint detection this time (Rxna to Rxng, where n=1 or 2), are set at the DC potential VDC. In the above condition, each of the drive electrodes Tx1a to Tx1i, Tx2a to Tx2i, and Tx3a to Tx3i is sequentially driven (scanned) with the drive pulse Sig2 having a predetermined cycle by the drive circuit FPSTxDr of the sensor IC chip SIC used for fingerprint detection. Consequently, detected signals are output from the detection electrodes Rx3a to Rx3g to the lead wires R1 to R7 respectively and the detected signals are input into the detection circuit FPSDT.

Through the abovementioned behaviors, an operation similar to the operation explained about the mutual detection scheme makes it possible to detect a fingerprint of a finger on the plane of the active region AA of the sensor panel SPNL.

(Configuration Example of Sensor Panel Capable of Executing Touch Detection and Fingerprint Detection)

Figure 8:
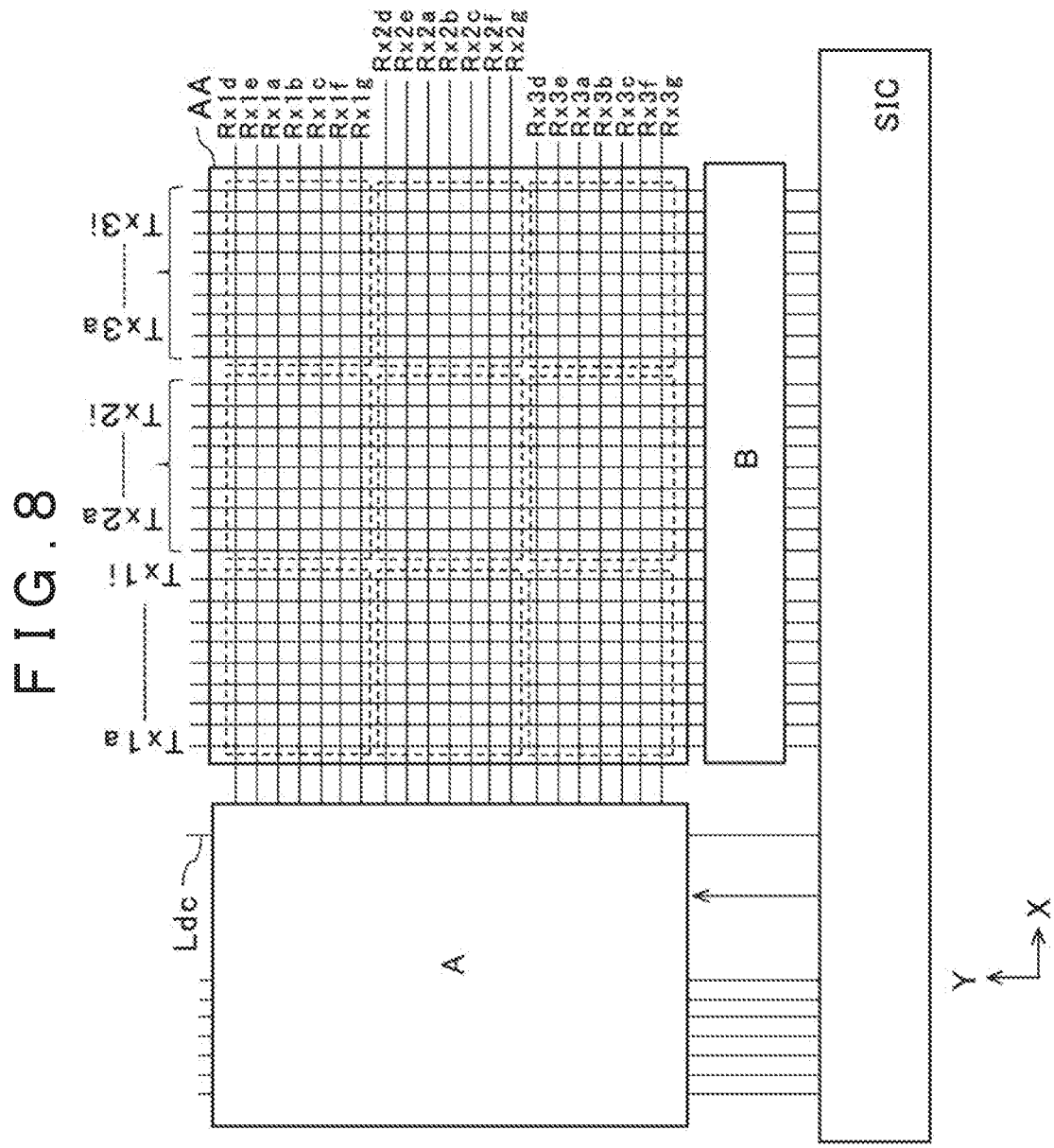
FIG. 8 is a diagram showing a configuration example of a sensor panel capable of executing touch detection and fingerprint detection.
Figure 9:
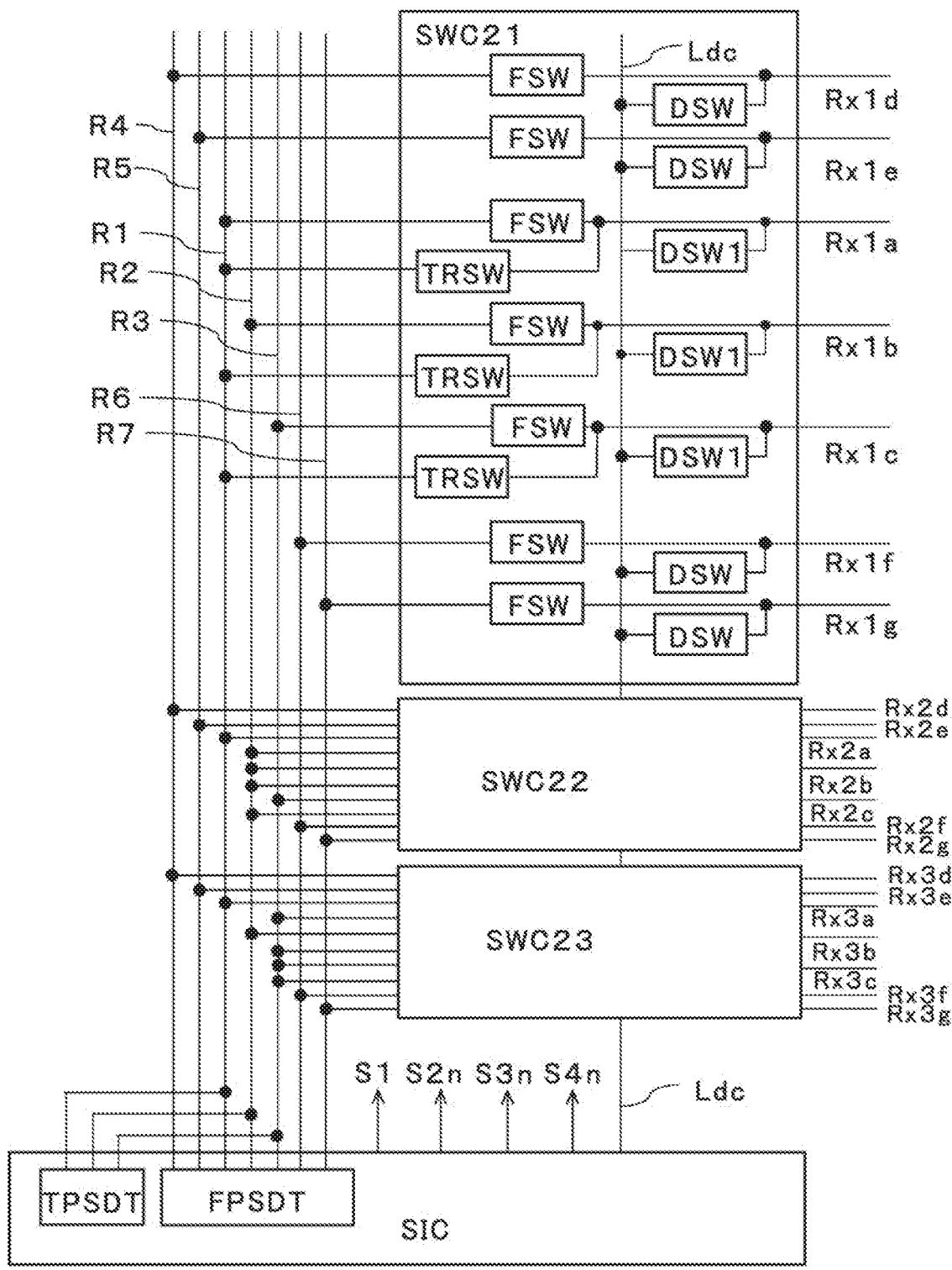
FIG. 9 is a circuit diagram showing a configuration example of a region A shown in FIG. 8.
Figure 10:
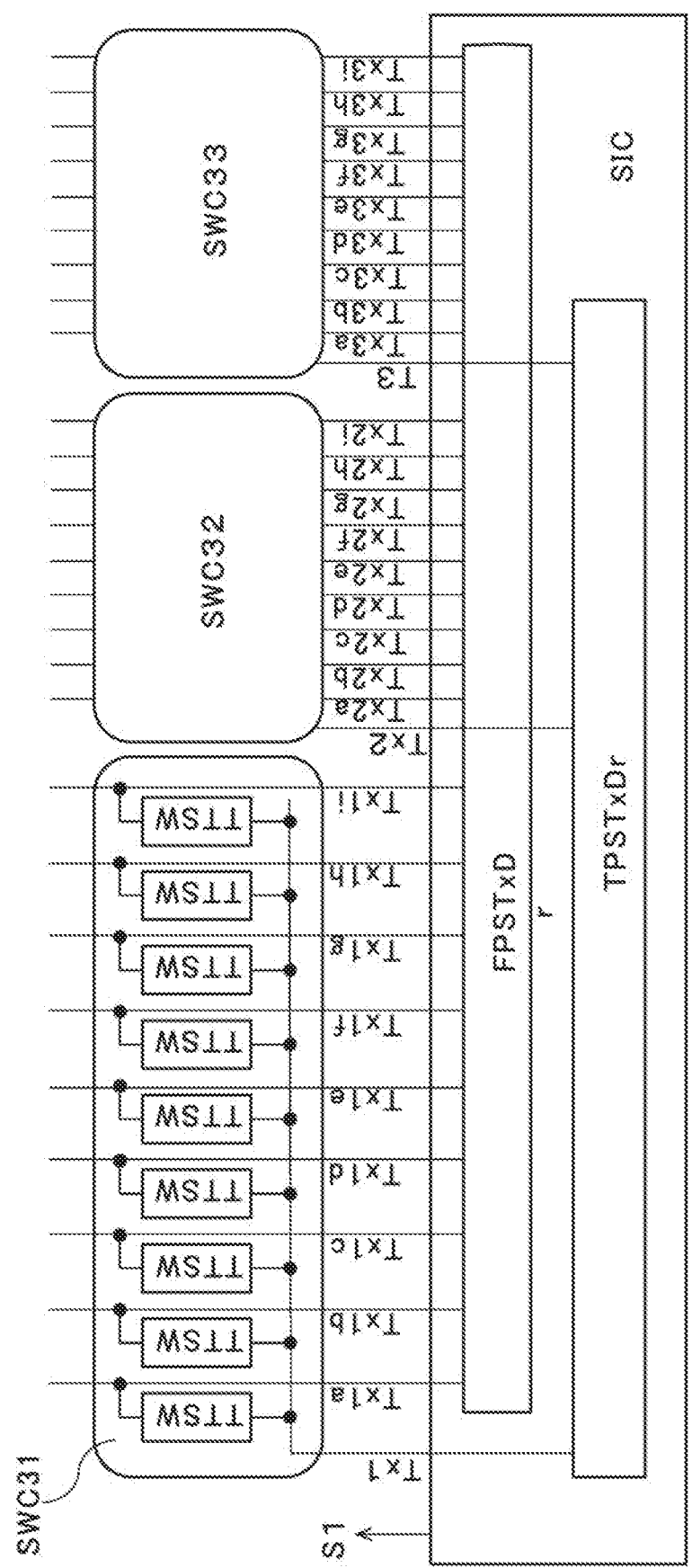
FIG. 10 is a circuit diagram showing a configuration example of a region B shown in FIG. 8.

FIG. 8 is a diagram showing a configuration example of a sensor panel capable of executing touch detection and fingerprint detection. FIG. 9 is a circuit diagram showing a configuration example of a region A shown in FIG. 8. FIG. 10 is a circuit diagram showing a configuration example of a region B shown in FIG. 8. A sensor panel SPNL shown in FIG. 8, FIG. 9, and FIG. 10 show a basic configuration example of the sensor panel SPNL shown in FIG. 1. Here, in order to avoid the complexity of FIG. 8, the reference signs of the touch detection nodes TN1 to TN9 shown in FIG. 4 are not depicted in FIG. 8, but the reference signs of the touch nodes TN1 to TN9 shown in FIG. 4 will be used in the following explanations.

In FIG. 8, the configurations and functions of detection electrodes Rx1a to Rx1g, Rx2a to Rx2g, Rx3a to Rx3g, and drive electrodes Tx1a to Tx1i, Tx2a to Tx2i, and Tx3a to Tx3i are the same as those shown in FIG. 6, therefore redundant descriptions will be omitted. In addition, it will be assumed that touch detection nodes TN1 to TN9 are the same as those shown in FIG. 4 respectively.

In FIG. 9, each of switch circuits SW21 to SW23 includes the switch circuit (SWCn, where n=1, 2, or 3) shown in FIG. 7 and the three switch elements TRSW described in FIG. 5 as shown by the switch circuit SWC21 as a representative. The configurations of the switch circuits SWC22 and SWC23 are almost the same as that of the switch circuit SWC21, but the connection points of the three switch elements TRSW of the switch circuit SWC21, those of the switch circuit SWC22, and those of the switch circuit SWC23 are different from one another as described in FIG. 5. In other words, the three switch elements TRSW installed in the switch circuit SWC21 are prepared for bundling the detection electrodes Rx1a, Rx1b, and Rx1c and electrically connecting these electrodes to the lead wire R1. The three switch elements TRSW installed in the switch circuit SWC22 are prepared for bundling the detection electrodes Rx2a, Rx2b, and Rx2c and electrically connecting these electrodes to the lead wire R2. The three switch elements TRSW installed in the switch circuit SWC23 are prepared for bundling the detection electrodes Rx3a, Rx3b, and Rx3c and electrically connecting these electrodes to the lead wire R3.

At the time of touch position detection, each of the switch elements TRSW is set in an on-state by a switch signal S1 of a high level output from a sensor IC chip SIC as described in FIG. 5. On the other hand, at the time of fingerprint detection, each of the switch elements TRSW is set in an off-state by the switch signal S1 of a low level output from the sensor IC chip SIC.

Each of the switch circuits SWC21 to SWC23 is different from the switch circuit SWC shown in FIG. 7 in that the reference signs of three switch elements connected to the detection electrodes Rx1a, Rx1b, and Rx1c are changed from DSW to DSW1 as shown by the switch circuit SWC21, which is a representative, in FIG. 9. The behaviors of the switch elements DSW1 and the behaviors of the switch elements DSW are different at the time of touch detection. To put it concretely, at the time of fingerprint detection, the switch elements DSW1 and the switch elements DSW are set in an on-state or in an off-state at the same time. On the other hand, at the time of touch detection, the switch elements DSW1 are set in an off-state, and the switch elements DSW are set in an on-state.

Next, switch signals S2n, S3n, and S4n output from the sensor IC chip SIC will be explained.

As for a switch signal S2n (n=1, 2, or 3), a switch signal S21 (n=1) is supplied to plural switch elements FSW of the switch circuit SWC21, a switch signal S22 (n=2) is supplied to plural switch elements FSW of a switch circuit SWC22, and a switch signal S23 (n=3) is supplied to plural switch elements FSW of a switch circuit SWC23.

In the case where touch detection is executed at the touch detection nodes TN1 to TN9, the plural switch elements FSW of the switch circuits SWC21, SWC22, and SWC23 are set in an off-state by the switch signals S21, S22, and S23 of a low level respectively.

In the case where fingerprint detection is executed at the touch detection nodes TN1, TN2, and TN3, the plural switch elements FSW of the switch circuit SWC21 are set in an on-state by the switch signal S21 of a high level. On the other hand, the plural switch elements FSW of the switch circuit SWC22 are set in an off-state by the switch signal S22 of a low level, and the plural switch elements FSW of the switch circuit SWC23 are set in an off-state by the switch signal S23 of a low level.

In the case where fingerprint detection is executed at the touch detection nodes TN4, TN5, and TN6, the plural switch elements FSW of the switch circuit SWC22 are set in an on-state by the switch signal S22 of a high level. On the other hand, the plural switch elements FSW of the switch circuit SWC21 are set in an off-state by the switch signal S21 of a low level, and the plural switch elements FSW of the switch circuit SWC23 are set in an off-state by the switch signal S23 of a low level.

In the case where fingerprint detection is executed at the touch detection nodes TN7, TN8, and TN9, the plural switch elements FSW of the switch circuit SWC23 are set in an on-state by the switch signal S23 of a high level. On the other hand, the plural switch elements FSW of the switch circuit SWC21 are set in an off-state by the switch signal S21 of a low level, and the plural switch elements FSW of the switch circuit SWC22 are set in an off-state by the switch signal S22 of a low level.

As for a switch signal S3n (n=1, 2, or 3), a switch signal S31 (n=1) is supplied to plural switch elements DSW of the switch circuit SWC21, a switch signal S32 (n=2) is supplied to plural switch elements DSW of the switch circuit SWC22, and a switch signal S33 (n=3) is supplied to plural switch elements DSW of the switch circuit SWC23.

As for a switch signal S4n (n=1, 2, or 3), a switch signal S41 (n=1) is supplied to plural switch elements DSW1 of the switch circuit SWC21, a switch signal S42 (n=2) is supplied to plural switch elements DSW1 of the switch circuit SWC22, and a switch signal S43 (n=3) is supplied to plural switch elements DSW1 of the switch circuit SWC23.

In the case where touch detection is executed at the touch detection nodes TN1 to TN9, the plural switch elements DSW of the switch circuits SWC21, SWC22, and SWC23 are set in an on-state by the switch signals S31, S32, and S33 of a high level respectively. On the other hand, the plural switch elements DSW1 of the switch circuits SWC21, SWC22, and SWC23 are set in an off-state by the switch signals S41, S42, and S43 of a low level respectively.

In the case where fingerprint detection is executed at the touch detection nodes TN1, TN2, and TN3, the plural switch elements DSW and DSW1 of the switch circuit SWC21 are set in an off-state by the switch signals S31 and S41 of a low level respectively. On the other hand, the plural switch elements DSW and DSW1 of the switch circuits SWC22 are set in an on-state by the switch signals S32 and S42 of a high level respectively, and the plural switch elements DSW and DSW1 of the switch circuits SWC23 are set in an on-state by the switch signals S33 and S43 of a high level respectively.

In the case where fingerprint detection is executed at the touch detection nodes TN4, TN5, and TN6, the plural switch elements DSW and DSW1 of the switch circuit SWC22 are set in an off-state by the switch signals S32 and S42 of a low level respectively. On the other hand, the plural switch elements DSW and DSW1 of the switch circuits SWC21 are set in an on-state by the switch signals S31 and S41 of a high level respectively, and the plural switch elements DSW and DSW1 of the switch circuits SWC23 are set in an on-state by the switch signals S33 and S43 of a high level respectively.

In the case where fingerprint detection is executed at the touch detection nodes TN7, TN8, and TN9, the plural switch elements DSW and DSW1 of the switch circuit SWC23 are set in an off-state by the switch signals S33 and S43 of a low level respectively. On the other hand, the plural switch elements DSW and DSW1 of the switch circuits SWC21 are set in an on-state by the switch signals S31 and S41 of a high level respectively, and the plural switch elements DSW and DSW1 of the switch circuits SWC22 are set in an on-state by the switch signals S32 and S42 of a high level respectively.

The detection circuit TPSDT for touch position detection to which the lead wires R1, R2, and R3 are electrically connected, and the detection circuit FPSDT for fingerprint detection to which the lead wires R1 to R7 are electrically connected are installed in the sensor IC chip SIC. The detection circuit TPSDT for touch position detection is activated at the time of touch position detection and executes touch position detection. The detection circuit FPSDT for fingerprint detection is activated at the time of fingerprint detection and executes fingerprint position detection.

In FIG. 10, the configurations of switch circuits SWC32 and SWC33 are almost the same as that of a switch circuit SWC31. Each of the switch circuits SWC31, SWC32, and SWC33 includes plural switch elements TTSW described in FIG. 5. The plural switch elements TTSW of the switch circuit SWC31 are installed for bundling drive electrodes Tx1a to Tx1i and treating these drive electrode as one drive electrode Tx1. The plural switch elements TTSW of the switch circuit SWC32 are installed for bundling drive electrodes TX2a to Tx2i and treating these drive electrode as one drive electrode Tx2. The plural switch elements TTSW of the switch circuit SWC33 are installed for bundling drive electrodes TX3a to Tx3g and treating these drive electrode as one drive electrode Tx3.

The on-state and off-state of each of the switch elements TTSW of the switch circuits SWC1, SWC2, and SWC3 are controlled by the switch signal S1 output from the sensor IC chip SIC. Each switch elements TTSW is set in an on-state by the high level of the switch signal S1 at the time of touch position detection and set in an off-state by the low level of the switch signal S1 at the time of fingerprint detection.

The sensor IC chip SIC includes a drive circuit TPSTxDr for touch position detection and a drive circuit FPSTxDr for fingerprint detection. The drive electrodes Tx1 to Tx3 are electrically connected to the drive circuit TPSTxDr for touch position detection. The drive electrodes Tx1a to Tx1i, Tx2a to Tx2i, and Tx3a to Tx3i are electrically connected to the drive circuit FPSTxDr for fingerprint detection. In addition, the output impedance of the drive circuit FPSTxDr for fingerprint detection becomes high.

Figure 11:
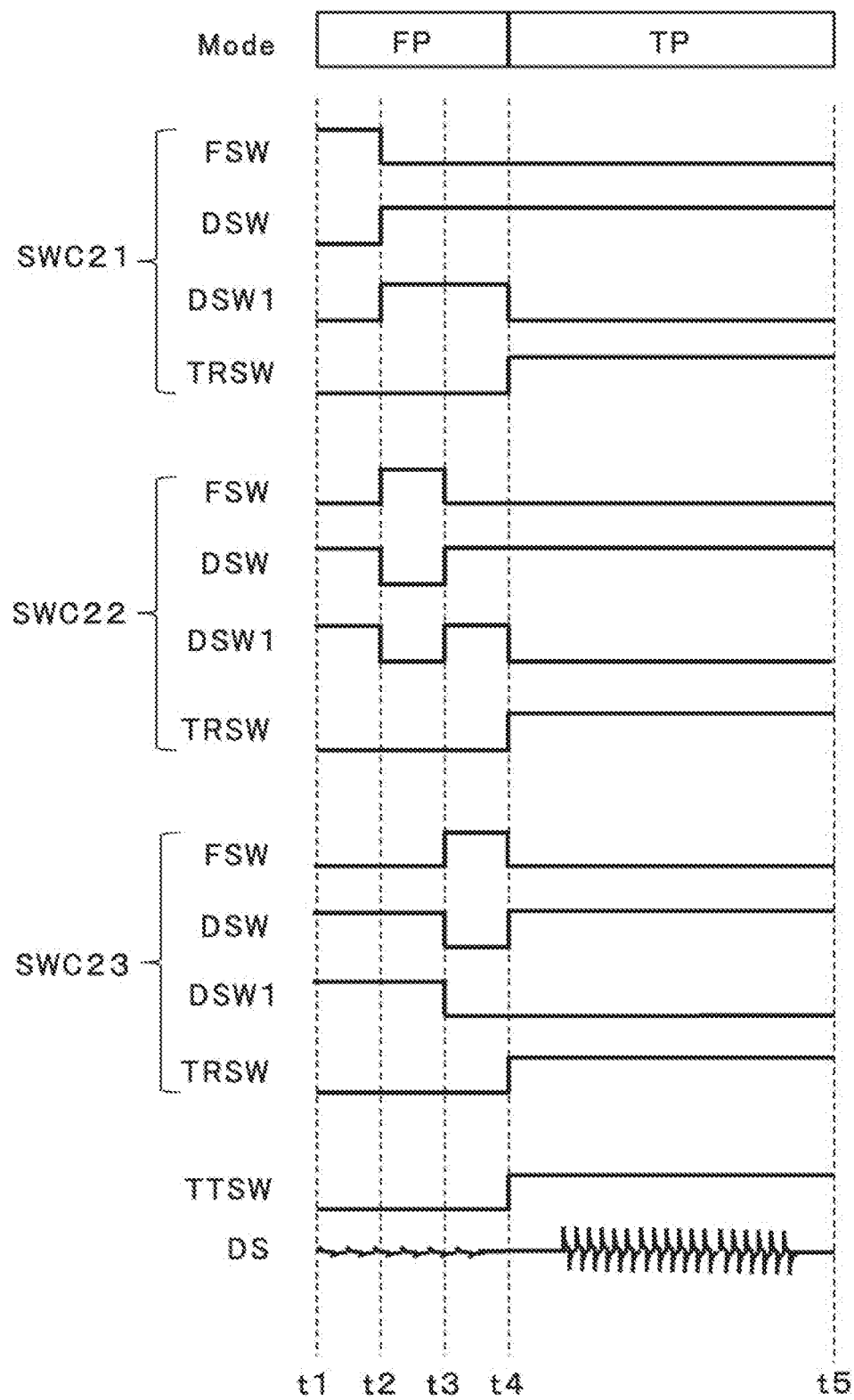
FIG. 11 is a diagram for explaining the behavior of the sensor panel.

Next, the behavior of the sensor panel SPNL will be explained using FIG. 11. The sensor mode of the sensor panel SPNL includes a fingerprint detection mode FP and a touch detection mode TP. FIG. 11 shows the behavior of the sensor panel SPNL in which fingerprint detection is executed in the fingerprint detection mode FP first and the mode of the sensor panel SPNL shifts from the fingerprint detection mode FP to the touch detection mode TP and touch detection is executed next.

A period between the time t1 and the time t4 is a period of the fingerprint detection mode FP, and a period between the time t4 and the time t5 is a period of the touch detection mode TP. It will be assumed that, in the fingerprint detection mode FP, fingerprint detection at touch detection nodes TN1, TN2, and TN3 is executed first, fingerprint detection at touch detection nodes TN4, TN5, and TN6 is executed next, and fingerprint detection at touch detection nodes TN7, TN8, and TN9 is executed finally.

During a period between the time t1 and the time t2, the fingerprint detection at the touch detection nodes TN1, TN2, and TN3 is executed. In the switch circuit SWC21, the switch elements FSW are set in an on-state, and the switch elements DSW, DSW1, and TRSW are set in an off-state. In the switch circuits SWC22 and SWC23, the switch elements FSW and TRSW are set in an off-state, and the switch elements DSW and DSW1 are set in an on-state. Furthermore, the switch elements TTSW of the switch circuits SWC31 to SWC33 are set in an off-state. In the above condition, each of the drive electrodes Tx1a to Tx1i, Tx2a to Tx2i, and Tx3a to Tx3i is driven (scanned) with a drive pulse Sig2 having a predetermined cycle by the drive circuit FPSTxDr for fingerprint detection. With this, detection signals DS at the seven electrodes Rx1a to Rx1g installed at the touch detection nodes TN1, TN2, and TN3 are output to the lead wires R1 to R7 respectively, and input into the detection circuit FPSDT.

During a period between the time t2 and the time t3, the fingerprint detection at the touch detection nodes TN4, TN5, and TN6 is executed. In the switch circuit SWC22, the switch elements FSW are set in an on-state, and the switch elements DSW, DSW1, and TRSW are set in an off-state. In the switch circuits SWC21 and SWC23, the switch elements FSW and TRSW are set in an off-state, and the switch elements DSW and DSW1 are set in an on-state. Furthermore, the switch elements TTSW of the switch circuits SWC31 to SWC33 are set in an off-state. In the above condition, each of the drive electrodes Tx1a to Tx1i, Tx2a to Tx2i, and Tx3a to Tx3i is driven (scanned) with the drive pulse Sig2 having a predetermined cycle by the drive circuit FPSTxDr for fingerprint detection. With this, detection signals DS at the seven electrodes Rx2a to Rx2g installed at the touch detection nodes TN4, TN5, and TN6 are output to the lead wires R1 to R7 respectively, and input into the detection circuit FPSDT.

During a period between the time t3 and the time t4, the fingerprint detection at the touch detection nodes TN7, TN8, and TN9 is executed. In the switch circuit SWC23, the switch elements FSW are set in an on-state, and the switch elements DSW, DSW1, and TRSW are set in an off-state. In the switch circuits SWC21 and SWC22, the switch elements FSW and TRSW are set in an off-state, and the switch elements DSW are set in an on-state. Furthermore, the switch elements TTSW of the switch circuits SWC31 to SWC33 are set in an off-state. In the above condition, each of the drive electrodes Tx1a to Tx1i, Tx2a to Tx2i, and Tx3a to Tx3i is driven (scanned) with the drive pulse Sig2 having a predetermined cycle by the drive circuit FPSTxDr for fingerprint detection. With this, detection signals DS at the seven detection electrodes Rx3a to Rx3g installed at the touch detection nodes TN7, TN8, and TN9 are output to the lead wires R1 to R7 respectively, and input into the detection circuit FPSDT.

During a period between the time t4 and the time t5, touch detection at the touch detection nodes TN1 to TN9 is executed. In the switch circuits SWC21, SWC22, and SWC23, the switch elements FSW and DSW1 are set in an off-state, and the switch elements DSW and TRSW are set in an on-state. Furthermore, the switch elements TTSW of the switch circuits SWC31 to SWC33 are set in an on-state.

In other words, the three detection electrodes Rx1a, Rx1b, and Rx1c are bundled by the three switch elements TRSW which are in an on-state, and the three detection electrodes are treated as one detection electrode Rx1. The three detection electrodes Rx2a, Rx2b, and Rx2c are bundled by the three switch elements TRSW which are in an on-state, and the three detection electrodes are treated as one detection electrode Rx2. The three detection electrodes Rx3a, Rx3b, and Rx3c are bundled by the three switch elements TRSW which are in an on-state, and the three detection electrodes are treated as one detection electrode Rx3. Furthermore, the nine drive electrodes Tx1a to Tx1i are bundled by the nine switch elements TTSW which are in an on-state, and the nine drive electrodes are treated as one drive electrode Tx1. The nine drive electrodes Tx2a to Tx2i are bundled by the nine switch elements TTSW which are in an on-state, and the nine drive electrodes are treated as one drive electrode Tx2. The nine drive electrodes Tx3a to Tx3i are bundled by the nine switch elements TTSW which are in an on-state, and the nine drive electrodes are treated as one drive electrode Tx3.

In the above condition, the drive electrodes Tx1 to Tx3 are driven (scanned) with the drive pulse Sig1 having a predetermined cycle by the drive circuit TPSTxDr for touch position detection. Detection signals DS at the touch detection nodes TN1 to TN9 are output to the lead wires R1 to R3 respectively, and input into the detection circuit TPSDT.

The above descriptions can be summarized as follows.

At the time of touch detection, the plural drive electrodes (Tx1a to Tx1i, Tx2a to Tx2i, and Tx3a to Tx3i) are sequentially used for executing drive operations in units of N drive electrodes (where N represents the number, and N=9 in this case), and the plural detection electrodes (Rx1a to Rx1c, Rx2a to Rx2c, and Rx3a to Rx3c) are used for executing detection operations in units of L detection electrodes (where L represents the number, and L=3 in this case).

At the time of fingerprint detection, the plural drive electrodes (Tx1a to Tx1i, Tx2a to Tx2i, and Tx3a to Tx3i) are sequentially used for executing drive operations one by one, and the plural detection electrodes (Rx1a to Rx1c, Rx2a to Rx2c, and Rx3a to Rx3c) are used for executing detection operations in units of at least L detection electrodes (where L represents the number).

(Configuration Example of Touch Detection Nodes of Sensor Panel Shown in FIG. 1)

Figure 12:
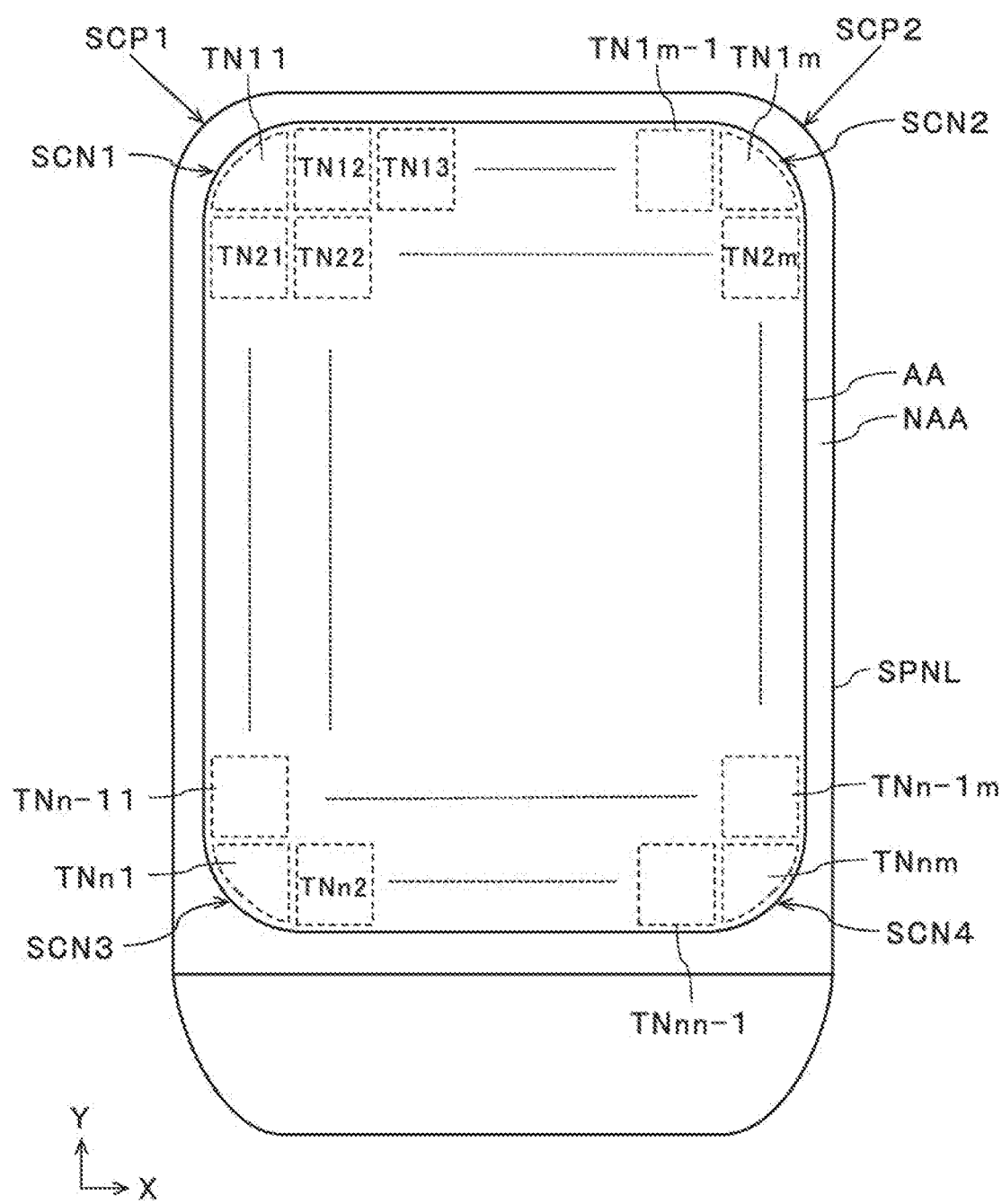
FIG. 12 is a diagram for explaining a configuration example of the touch detection node of the sensor panel shown in FIG. 1.

FIG. 12 is a diagram for explaining a configuration example of the touch detection nodes of the sensor panel shown in FIG. 1. In the active region AA of the sensor panel SPNL, touch detection nodes TN11 to TN1m, TN21 to TN2m, TNn1 to TNnm are virtually disposed both in the first direction X and in the second direction Y, that is, in a matrix shape. The four corner portions SCN1 to SCN4 of the active region AA of the sensor panel SPNL are formed in shapes rounded like circular arcs as described in FIG. 1. Therefore, four detection touch nodes TN11, TN1m, TNn1, and TNnm installed at the four corner portions SCN1 to SCN4 of the active region AA are also formed in shapes rounded like circular arcs.

(Explanation about Corner Portion According to Comparative Example)

Figure 13:
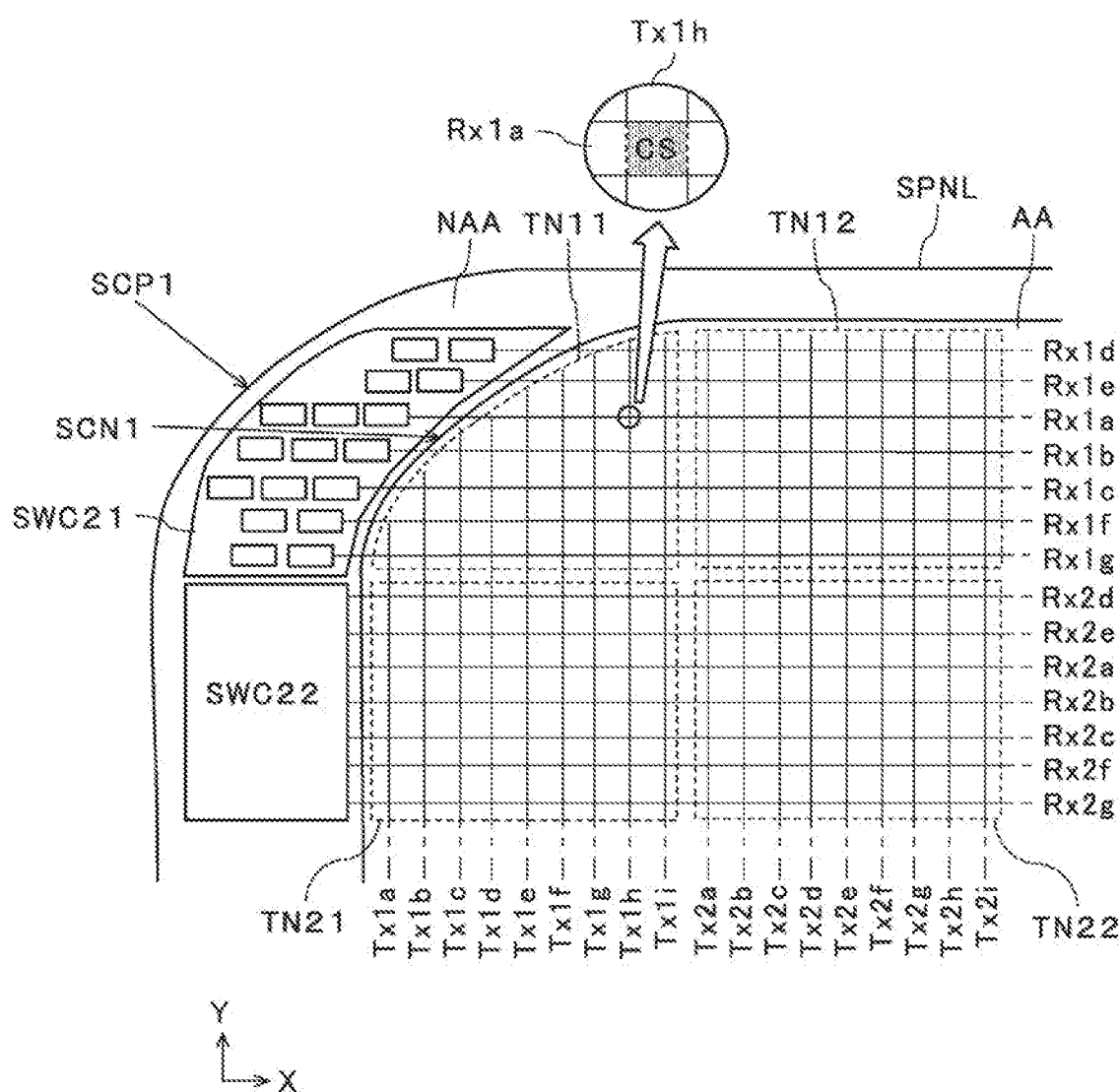
FIG. 13 is an enlarged view for schematically showing a corner portion according to a comparative example.

FIG. 13 is an enlarged view for schematically showing a corner portion according to a comparative example. FIG. 13 shows the enlarged view of the vicinity of the corner portion SCN1 shown in FIG. 12, and the touch detection nodes TN11, TN12, TN21, and TN22, the switch circuits SWC21 and SWC22 shown in FIG. 9 are shown there. In the switch circuit SWC21 shown in FIG. 13, three switch elements TRSW shown in FIG. 9, seven switch elements FSW, and seven switch elements DSW and DSW1 are schematically shown by rectangular frames.

In FIG. 13, it will be assumed that drive electrodes Tx1a to Tx1i, and Tx2a to Tx2i have the same wire widths and they are disposed at even intervals. Similarly, it will be assumed that detection electrodes Rx1a to Rx1g, and Rx2a to Rx2g have the same wire widths and they are disposed at even intervals.

As shown in FIG. 13, the switch circuit SWC21 is disposed to the left of the touch detection node TN11 while being curved in the upper right direction so as to be housed within a nonactive region NAA located between the corner portion SCP1 of the sensor panel SPNL and the corner portion SCN1 of the active region AA. The nine drive electrodes Tx1a to Tx1i installed at the touch detection node TN11 are disposed inside of the corner portion SCN1 of the active region AA. In other words, the nine drive electrodes Tx1a to Tx1i are disposed inside of the touch detection node TN11.

Although lead wires R1 to R7, plural wires that supply the switch signals S1, S2n, S3n, and S4n to the switch elements TRSW, FSW, DSW, and DSW1, a wire Ldc, and the like are not shown in FIG. 13, these wires are disposed in the nonactive region NAA in the same way as the switch circuit SWC21 and SWC22. Therefore, the nonactive region where the switch circuit SWC21, SWC22, and the like are disposed are densely-packed with plural switch elements and plural wires in terms of layout.

Therefore, as an example, the length of the drive electrode Tx1a becomes shorter as shown at the touch detection nodes TN11. The length of the drive electrode Tx1b is longer than the length of the drive electrode Tx1a, but shorter than the length of the drive electrode Tx1c. The length of the drive electrode Tx1c is longer than the length of the drive electrode Tx1b, but shorter than the length of the drive electrode Tx1d. The length of the drive electrode Tx1d is longer than the length of the drive electrode Tx1c, but shorter than the length of the drive electrode Tx1e. The length of the drive electrode Tx1e is longer than the length of the drive electrode Tx1d, but shorter than the length of the drive electrode Tx1f. The length of the drive electrode Tx1f is longer than the length of the drive electrode Tx1e, but shorter than the length of the drive electrode Tx1g. The length of the drive electrode Tx1g is longer than the length of the drive electrode Tx1f, but shorter than the length of the drive electrode Tx1h. The length of the drive electrode Tx1h is longer than the length of the drive electrode Tx1g, but shorter than the length of the drive electrode Tx1i. The length of the drive electrode Tx1i is longer than the length of the drive electrode Tx1h and becomes the longest of the drive electrodes Tx1a to Tx1i. In addition, the length of the drive electrode Tx1i becomes shorter than any of the lengths of the drive electrode Tx2a to Tx2i. Here, a configuration in which at least one of the lengths of the drive electrodes Tx1a to Tx1i is shorter than any of the lengths of the drive electrodes Tx2a to Tx2i is also conceivable.

The configuration of a touch detection node TNn1 of a corner portion SCN3, which is not shown, is in the upside-down state of the configuration of the touch detection node TN11 shown in FIG. 13, so that the dispositions and lengths of nine drive electrodes Tx1a to Tx1i disposed at the touch detection node TNn1 are made the same as those of the nine drive electrodes Tx1a to Tx1i of the touch detection node TN11.

Furthermore, the configuration of a touch detection node TN1m of a corner portion SCN2 and the configuration of a touch detection node TNnm of a corner portion SCN4 are in the mirror reversed state of the configuration and in the mirror reversed and upside-down state of the configuration of the touch detection node TN11 shown in FIG. 13 respectively. Therefore, as for the relation among the lengths of nine drive electrodes Txma to Txmi (not shown) installed at each of the touch detection nodes TN1m and TNnm, the following inequality holds: Txma>Txmb>Txmc>Txmd>Txme>Txmf>Txmg>Txmh>Txmi.

It is obvious to those skilled in the art that the relation among the lengths of these drive electrodes (Tx1a to Tx1i, and Txma to Txmi) is like the abovementioned relation even in the case where the entirety of the active region AA is viewed in a plane view.

Hereinafter, mutual capacitors used for touch detection at each of the touch detection nodes TN11, TN12, TN21, and TN22 will be explained. At the time of touch detection, the capacitance values of mutual capacitors are influenced by or depend on the areas of intersectional portions of the detection electrodes RX1a, Rx1b, Rx1c, Rx2a, Rx2b, and Rx2c and the drive electrodes Tx1a to Tx1i and Tx2a to Tx2i.

At each of the touch detection nodes TN12, TN21, and TN22, the number of intersectional portions of the detection electrodes (Rx1a, Rx1b, and Rx1c, or Rx2a, Rx2b, and Rx2c) and the drive electrodes (Tx1a to Tx1i, or Tx2a to Tx2i) is 27 (3×9=27). On the other hand, at the touch detection node TN11, owing to the lengths of the drive electrodes Tx1a to Tx1i, the number of intersectional portions of the detection electrodes (Rx1a, Rx1b, and Rx1c) and the drive electrodes (Tx1a to Tx1i) is 21 which is smaller than 27 by 6 in this example.

As shown in FIG. 13 as an example, if the area of the intersectional portion of the detection electrode Rx1a and the drive electrode Tx1h is represented as CS, the sum of the areas of intersectional portions at the touch detection nodes TN12, TN21, and TN22 is 27 CS. On the other hand, the sum of the areas of intersectional portions at the touch detection node TN11 is 21 CS.

If the touch detection function of the entire display region of the display panel is optimized using, as a standard, the sum of the areas or mutual capacitors of the intersectional portions of drive electrodes and detection electrodes at any of the touch detection nodes TN12, TN21, and TN22, which do not reside in the corner portion SCN1, a touch detection result at the touch detection node TN11 in the corner portion SCN1 exceeds a detection range, so that there are cases where the touch detection results at the corner portions become improper.

(Explanation about Corner Portion According to First Embodiment)

Figure 14:
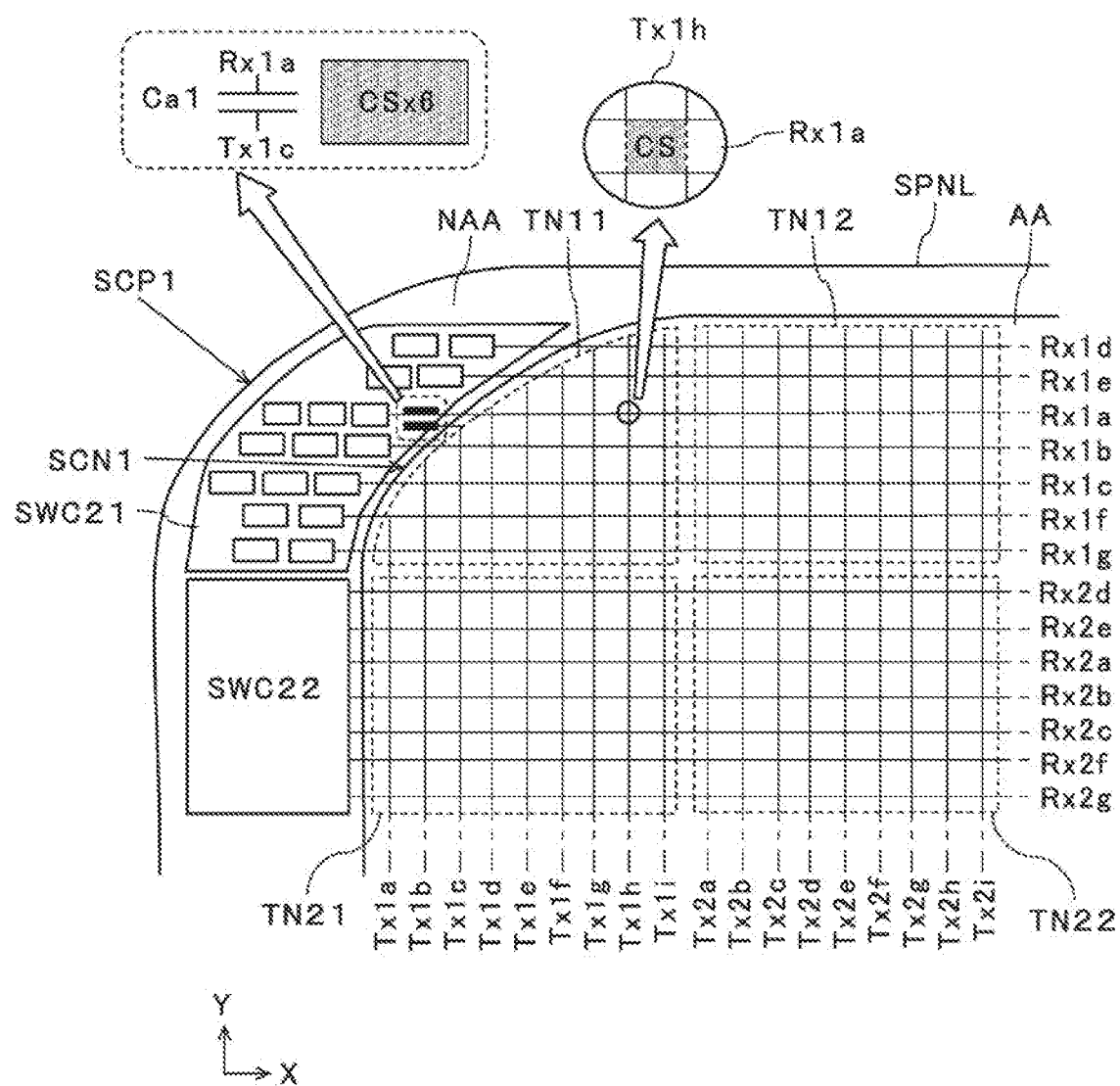
FIG. 14 is the schematically enlarged view of a corner portion according to the first embodiment.

FIG. 14 is the schematically enlarged view of a corner portion according to the first embodiment. FIG. 14 is different from FIG. 13 in that an auxiliary capacitance element (hereinafter referred to as an auxiliary capacitor) Ca1 is installed in the nonactive region NAA between the corner portion SCP1 of a sensor panel SPNL and the corner portion SCN1 of an active region AA (in other words, outside of the active region AA) in FIG. 14. Because the other constitutions of FIG. 14 are the same as those of FIG. 13, redundant descriptions will be omitted.

In this example, the auxiliary capacitor Ca1 is installed between the detection electrode Rx1a and the drive electrode Tx1c. Under the condition that the auxiliary capacitor Ca1 is installed outside of the active region AA, it is conceivable that the auxiliary capacitor Ca1 is installed, for example, between the detection electrode Rx1a and the drive electrode Tx1d, between the detection electrode Rx1b and the drive electrode Tx1c, between the detection electrode Rx1c and the drive electrode Tx1c, or between the detection electrode Rx1c and the drive electrode Tx1b. Installing the auxiliary capacitor Ca1 outside of the active region AA, that is, in the nonactive region NAA has no influence on the appearance and characteristics of the display region DA.

As mentioned above, at the touch detection node TN11, owing to the lengths of the drive electrodes Tx1a to Tx1i, the number of the intersectional portions of the detection electrodes (Rx1a, Rx1b, and Rx1c) and the drive electrodes (Tx1a to Tx1i) is 21 which is smaller than 27 by 6 in this example. Therefore, if the area of the intersectional portion of the detection electrode Rx1a and the drive electrode Tx1h is represented as CS, the auxiliary capacitor Ca1 is formed into a capacitance element having an area of an intersectional portion between the electrodes of the auxiliary capacitance Ca1 itself, in which the area is six times CS (CS×6) in a plane view, for example.

As a result, the sum of the areas of the intersectional portions of the drive electrodes (Tx1a to Tx1i) and the detection electrodes (Rx1a, Rx1b, and Rx1c) (the area of the intersectional portion of the auxiliary capacitor Ca1 (CS×6)+the area of 21 intersectional portions (Cs×21)=Cs×27) is set substantially equal to the sum of the areas of the intersectional portions of the drive electrodes (Tx2a to Tx2i) and the detection electrodes (Rx1a, Rx1b, and Rx1c) (the area of the 27 intersectional portions (CS×27)). In other words, the mutual capacitors (detection capacitors) at the respective touch detection nodes can be substantially equalized.

Therefore, even if the touch detection function of the entire display region of the display panel is optimized using, as a standard, the sum of the areas or mutual capacitors of the intersectional portions of the drive electrodes and the detection electrodes at any of the touch detection nodes TN12, TN21, and TN22, which do not reside in the corner portion SCN1, a touch detection result at the touch detection node TN11 in the corner portion SCN1 does not exceed the detection range. With this, it becomes possible to make a touch detection result at a corner portion proper. Therefore, the detection accuracy of the touch detection of the entirety of the active region of the sensor panel SPNL can be improved.

To restate the configuration shown in FIG. 14, the configuration can be described as follows.

In other words, among the plural drive electrodes (Tx1a to Tx1i and Tx2a to Tx2i), any of the lengths of N first drive electrodes (Tx1a to Tx1i) (where N represents the number, and N=9 in this example), which are continuously adjacent to one another, is shorter than any of the lengths of the other drive electrodes (Tx2a to Tx2i). Alternatively, a configuration, in which, among the plural drive electrodes (Tx1a to Tx1i and Tx2a to Tx2i), the length of at least one of the N first drive electrodes (Tx1a to Tx1i) (N=9 in this example), which are continuously adjacent to one another, is shorter than any of the lengths of the other drive electrodes (Tx2a to Tx2i), is conceivable. It can be said that an area (CS×6) where at least one drive electrode (Tx1c) among the N first drive electrodes (Tx1a to Tx1i) and at least one detection electrode (Rx1a) overlap each other is larger than the area (CS) of an intersectional portion where any other drive electrode (for example, Tx2a) and any other detection electrode (for example, Rx1b) overlap each other. A large site where the overlapping area (CS×6) is large is located outside of the display region DA of the display panel PNL or outside of the active region AA of the sensor panel SPNL. In other words, the large site is located in the nondisplay region NDA of the display panel PNL or in the nonactive region NAA of the sensor panel SPNL.

In addition, the plural drive electrodes (Tx1$a$ to Tx1$i$, and Tx2$a$ to Tx2$i$) further include N second drive electrodes (Tx2$a$ to Tx2$i$) which are continuously adjacent to one another, where N represents the number, and N=9 in this case. The plural detection electrodes (Rx) include L detection electrodes (Rx1$a$ to Rx1$c$) which are continuously adjacent to one another (L represents the number, and L=3 in this case). It can be said that the sum of the areas (CS×21+CS×6) of the intersectional portions of the N first drive electrodes (Tx1$a$ to Tx1$i$) and the L detection electrodes (Rx1$a$ to Rx1$c$) is substantially equal to the sum of the areas (CS×27) of the intersectional portions of the N second drive electrodes (Tx2$a$ to Tx2$i$) and the L detection electrodes (Rx1$a$ to Rx1$c$).

Figure 15:
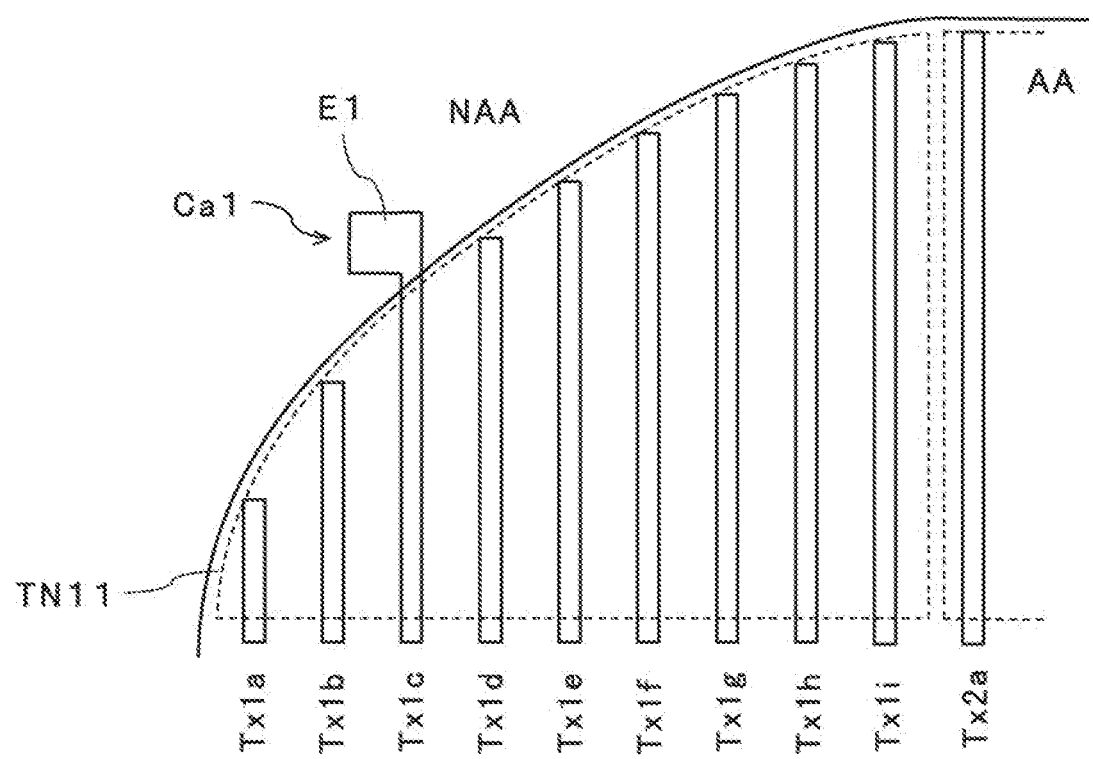
FIG. 15 is a plan view showing a configuration example of drive electrodes according to the first embodiment.
Figure 16:
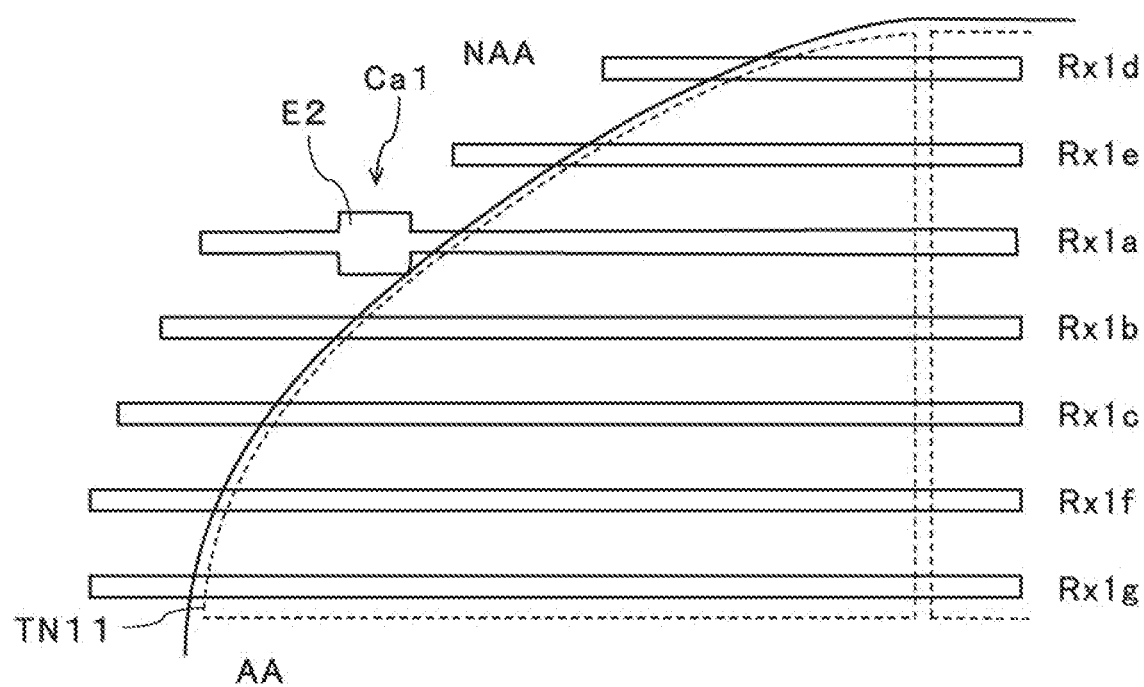
FIG. 16 is a plan view showing a configuration example of detection electrodes according to the first embodiment.
Figure 17:
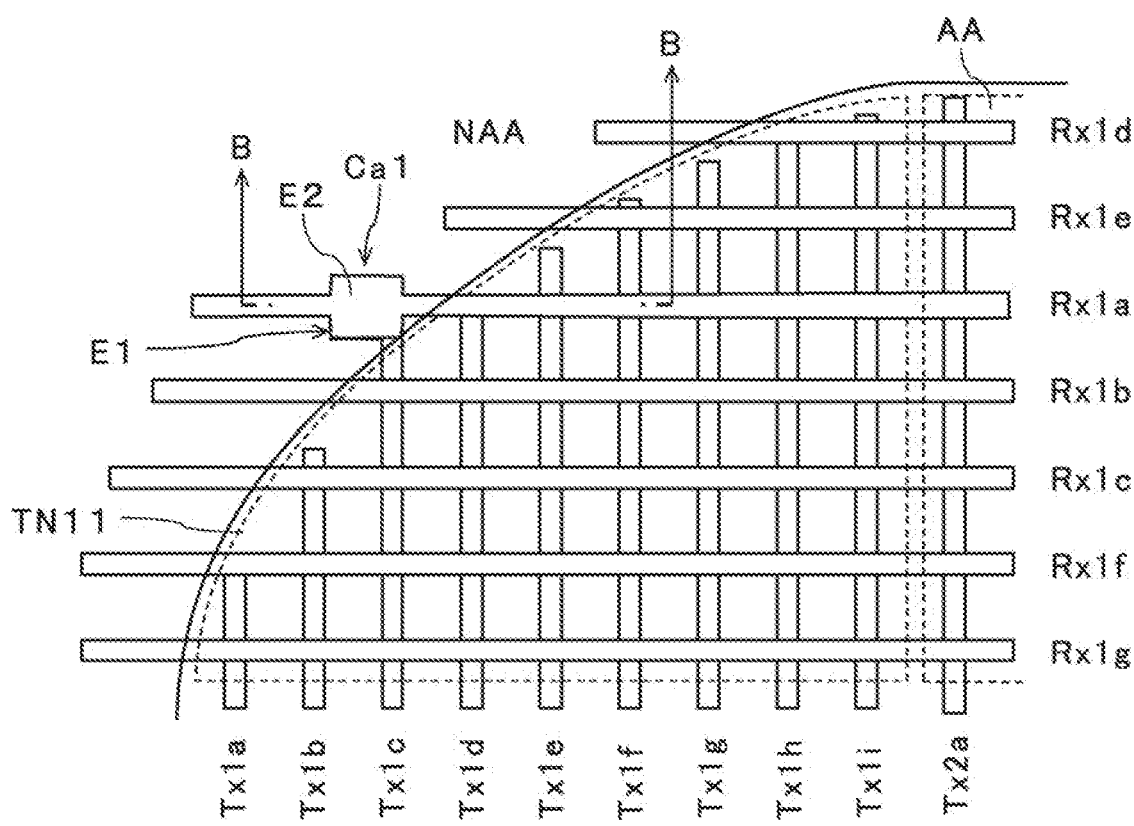
FIG. 17 is a plan view showing a state in which FIG. 15 and FIG. 16 overlap each other.

A configuration example of the auxiliary capacitor Ca1 according to the first embodiment will be explained using FIG. 15, FIG. 16, and FIG. 17. FIG. 15 is a plan view showing a configuration example of drive electrodes according to the first embodiment. FIG. 16 is a plan view showing a configuration example of detection electrodes according to the first embodiment. FIG. 17 is a plan view showing a state in which FIG. 15 and FIG. 16 overlap each other.

As shown in FIG. 15, the drive electrode Tx1$c$ has a wide region E1 in the nonactive region NAA. This wide region E1 constitutes one electrode of the auxiliary capacitor Ca1. On the other hand, as shown in FIG. 16, the detection electrode Rx1$a$ has a wide region E2 in the nonactive region NAA. This wide region E2 constitutes the other electrode of the auxiliary capacitor Ca1.

FIG. 17 shows a state in which the detection electrodes Rx1$a$ to Rx1$g$ shown in FIG. 16 overlap the drive electrodes Tx1$a$ to Tx1$i$, and Tx2$a$ shown in FIG. 15. The wide region E1 and the wide region E2, which are formed in the nonactive region NAA, overlap each other, so that the auxiliary capacitor Ca1 is formed in the nonactive region NAA.

(First Configuration Example of Auxiliary Capacitor Ca1)

Figure 18:
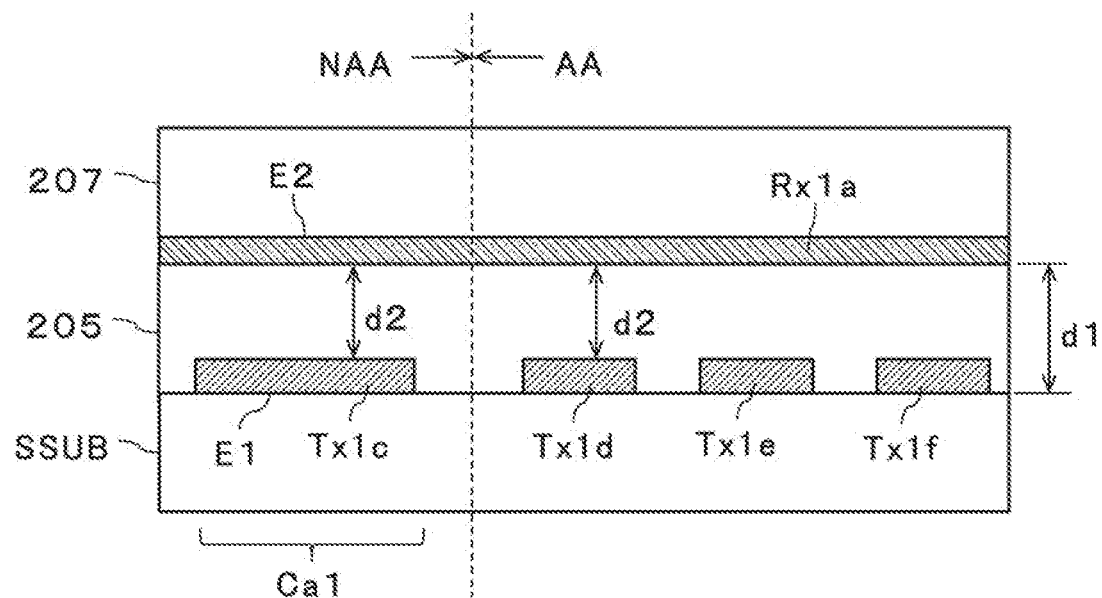
FIG. 18 is a cross-sectional view taken along the line B-B of FIG. 17 for explaining a first configuration example of an auxiliary capacitor.

FIG. 18 is a cross-sectional view taken along the line B-B of FIG. 17 for explaining a first configuration example of the auxiliary capacitor. The first configuration example of the auxiliary capacitor Ca1 will be explained using FIG. 18.

If it is possible to form the wide region E1 which constitutes one electrode of the auxiliary capacitance Ca1 and the wide region E2 which constitutes the other electrode of the auxiliary capacitance Ca1 in such a way that both regions occupy desired areas respectively in the nonactive region NAA, the auxiliary capacitor Ca1 can be formed as shown in in FIG. 18.

As shown in FIG. 18, the film thickness d1 of a first insulating film 205 in the nonactive region NAA and that in the active region AA are set equal to each other. Therefore, the film thickness d2 of the first insulating film 205 between the upper surface of the region E1 and the lower surface of the region E2 can be set equal to the film thickness d2 of the first insulating film 205 between the upper surface of the drive electrode Tx1$a$ (or Tx1$e$ or Tx1$f$) and the lower surface of the detection electrode Rx1$a$.

According to the first configuration example of the auxiliary capacitor Ca1, it is not necessary to especially add a new manufacturing process or change the existing manufacturing processes for the configuration of the auxiliary capacitance Ca1.

(Second Configuration Example of Auxiliary Capacitor Ca21)

Figure 19:
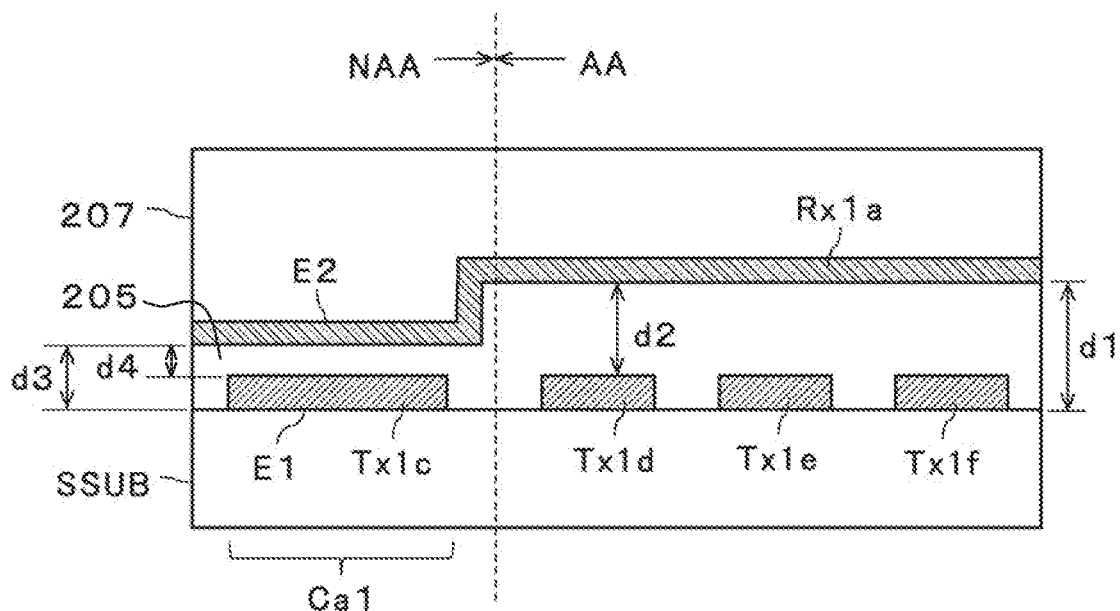
FIG. 19 is a cross-sectional view taken along the line B-B of FIG. 17 for explaining a second configuration example of an auxiliary capacitor.

FIG. 19 is a cross-sectional view taken along the line B-B of FIG. 17 for explaining a second configuration example of the auxiliary capacitor. The second configuration example of the auxiliary capacitor Ca1 will be explained using FIG. 19.

There are cases where it is impossible to form the wide region E1, which constitutes one electrode of the auxiliary capacitance Ca1, with a desired area and the wide region E2, which constitutes the other electrode of the auxiliary capacitance Ca1, with a desired area in the nonactive region NAA. In other words, there is a case where there is not a sufficient area in which the auxiliary capacitor Ca1 can be disposed in terms of layout in the switch circuit SWC1 shown in FIG. 14. Or it is also conceivable that the auxiliary capacitor Ca1 with a desired capacitance value cannot be obtained in the configuration shown in FIG. 18. In such a case, the auxiliary capacitor Ca1 can be obtained in a way shown in FIG. 19.

FIG. 19 is different from FIG. 18 in that the film thickness d3 of the first insulating film 205 in the nonactive region NAA is set thinner than the film thickness d1 of the first insulating film 205 in the active region AA (d3<d1) in FIG. 19. Because of the above situation, the film thickness d4 of the first insulating film 205 between the upper surface of the region E1 and the lower surface of the region E2 is set thinner than the film thickness d2 of the first insulating film 205 between the upper surface of the region E1 and the lower surface of the region E2 in FIG. 18 (d4<d2). As a result, the capacitance value of the auxiliary capacitor Ca1 shown in FIG. 19 can be made larger than the capacitance value of the auxiliary capacitor Ca1 shown in FIG. 18.

According to the second configuration example of the auxiliary capacitor Ca1, even if it is impossible to form the wide region E1, which constitutes one electrode of the auxiliary capacitance Ca1, with a desired area and the wide region E2, which constitutes the other electrode of the auxiliary capacitance Ca1, with a desired area in the nonactive region NAA, the auxiliary capacitor Ca1 with a desired capacitance value can be formed by adjusting the film thickness d4 of the first insulating film 205.

Furthermore, the capacitance value of the auxiliary capacitor Ca1 can also be fine-tuned by adjusting the film thickness d4 of the first insulating film 205 between the upper surface of the region E1 and the lower surface of the region E2 using etching or the like. Therefore, the auxiliary capacitor Ca1 with a desired capacitance value can be formed in a comparatively easy way.

(Configuration Example of Disposition Position of Auxiliary Capacitor)

Figure 20:
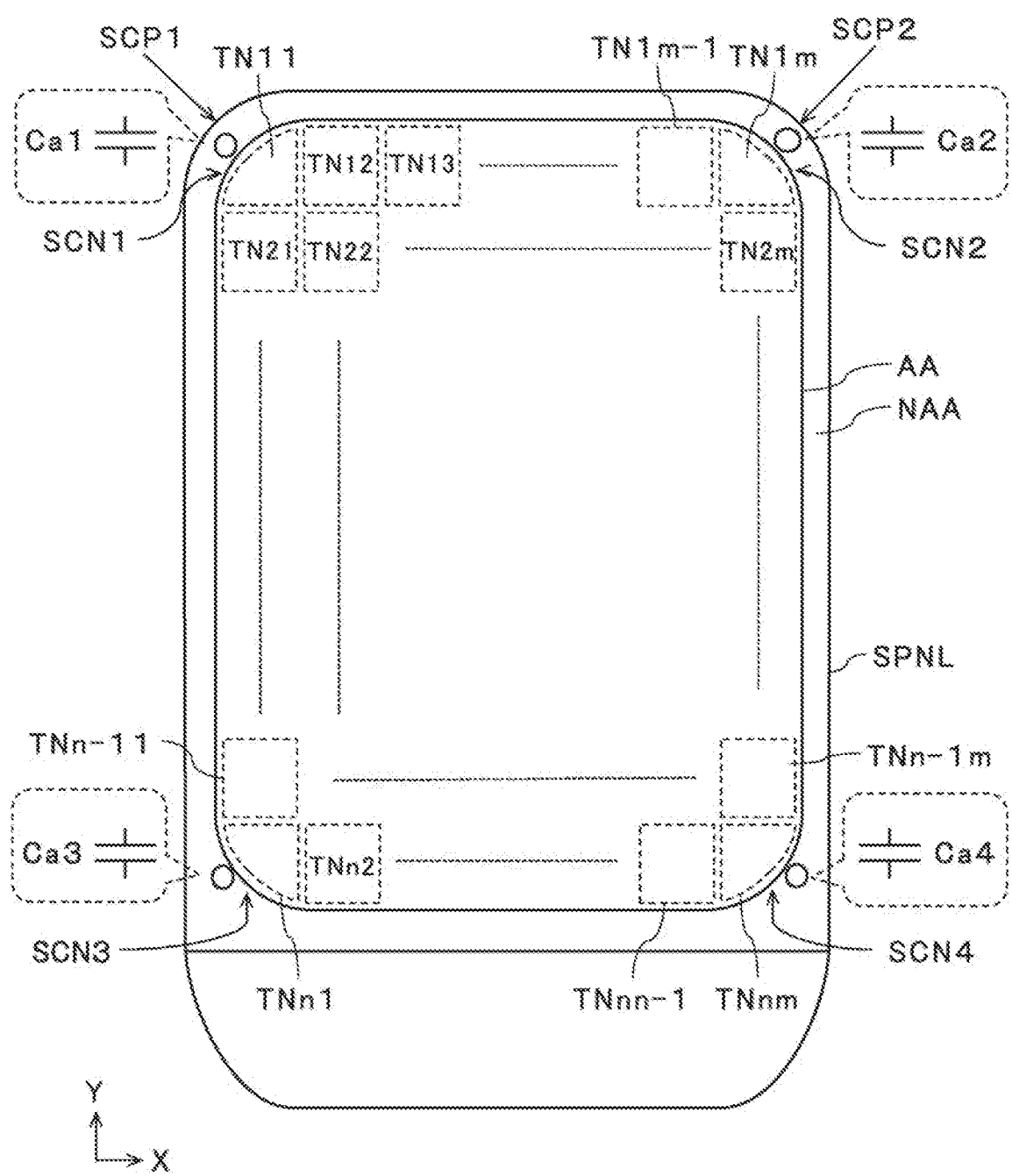
FIG. 20 is a diagram for explaining a configuration example of the disposition positions of auxiliary capacitors according to the first embodiment.

FIG. 20 is a diagram for explaining a configuration example of the disposition positions of auxiliary capacitors according to the first embodiment. As shown in FIG. 20, four auxiliary capacitors Ca1, Ca2, Ca3, and Ca4 are installed in the nonactive region NAA in the sensor panel shown in FIG. 1.

The auxiliary capacitor Ca1 is disposed in the nonactive region NAA located to the left side of the touch detection node TN11 in the corner portion SCN1 as described in FIG. 14. The auxiliary capacitor Ca2 is disposed in the nonactive region NAA located to the right side of the touch detection node TN1$m$ in the corner portion SCN2. The auxiliary capacitor Ca3 is disposed in the nonactive region NAA located to the left side of the touch detection node TN$n$1 in the corner portion SCN3. The auxiliary capacitor Ca4 is disposed in the nonactive region NAA located to the right side of the touch detection node TN$nm$ in the corner portion SCN4.

As described in FIG. 1, the nonactive region NAA overlaps the nondisplay region NDA of the display panel PNL, and the active region AA overlaps the display region DA of the display panel PNL. The corner portions SCN1 to SCN4 of the active region AA of the sensor panel SPNL correspond to the corner portions CN1 to CN4 of the display region DA of the display panel PNL respectively. Therefore, to restate that the four auxiliary capacitors Ca1, Ca2, Ca3, and Ca4 are installed in the corner portions CN1, CN2, CN3, and CN4 of the display region DA of the display panel PNL in other words, the four auxiliary capacitors are installed in the nondisplay region NDA outside of the display region DA.

As the configurations of the four auxiliary capacitors Ca1 to Ca4, the configuration described in FIG. 18 or that described in FIG. 19 can be adopted. In addition, it is also conceivable that, as the configuration of at least one of the four auxiliary capacitors Ca1 to Ca4, the configuration described in FIG. 18 is adopted, and as the configurations of the other auxiliary capacitors, the configuration described in FIG. 19 is adopted.

Because the auxiliary capacitors Ca1 and Ca3 are installed inside of the disposition region of the switch circuit (SWC21) as shown in FIG. 14, there are cases where a sufficient area for the auxiliary capacitor Ca1 or Ca3 to have a desired capacitance value cannot be obtained in a plane view. In such cases, it is advantageous to adopt the configuration of an auxiliary capacitor described in FIG. 19 for the auxiliary capacitor Ca1 or Ca3. On the other hand, if the disposition regions of the auxiliary capacitors Ca2 and Ca4 have comparatively larger leeway in terms of layout than the disposition regions of the auxiliary capacitors Ca1 and Ca3, the configuration of an auxiliary capacitor described in FIG. 18 can be adopted for the auxiliary capacitor Ca2 or Ca4.

According to the first embodiment, the following one or plural advantageous effects can be obtained.

1) Installing the auxiliary capacitors makes it possible that the mutual capacitors at the respective touch detection nodes are substantially equalized.

2) Thanks to the above 1), even if the touch detection function of the entire display region of the display panel or the entire active region of the sensor panel is optimized using, as a standard, the area or mutual capacitor of the intersectional portions of the drive electrodes and the detection electrodes at one of the touch detection nodes, which do not reside in the corner portions, touch detection results at the touch detection nodes in the corner portions do not exceed a detection range.

3) Thanks to the above 2), the detection accuracy of the touch detection of the entirety of the display region of the display panel or the entirety of the active region of the sensor panel SPNL can be improved.

4) Because the auxiliary capacitors are installed outside of the display region DA or outside of the active region AA, the auxiliary capacitors have no influence on the appearance and characteristics of the display region DA.

Next, a modification example according to the first embodiment will be explained.

First Alternation Example

According to the first embodiment, it is configured as described in FIG. 9 and FIG. 11 that both touch detection and fingerprint detection can be executed at the touch detection nodes TN11 to TN1$m$ that are located in the first row of FIG. 12 using the switch circuit SWC21. However, the configuration of the touch detection nodes TN11 to TN1$m$ is not limited to the above configuration. The touch detection nodes TN11 to TN1$m$ that are located in the first row of FIG. 12 can be configured in such a way that only fingerprint detection can be executed. In this case, the configuration of the switch circuit SWC21 is changed into the configuration of a switch circuit SWC21$a$ shown in FIG. 21.

Figure 21:
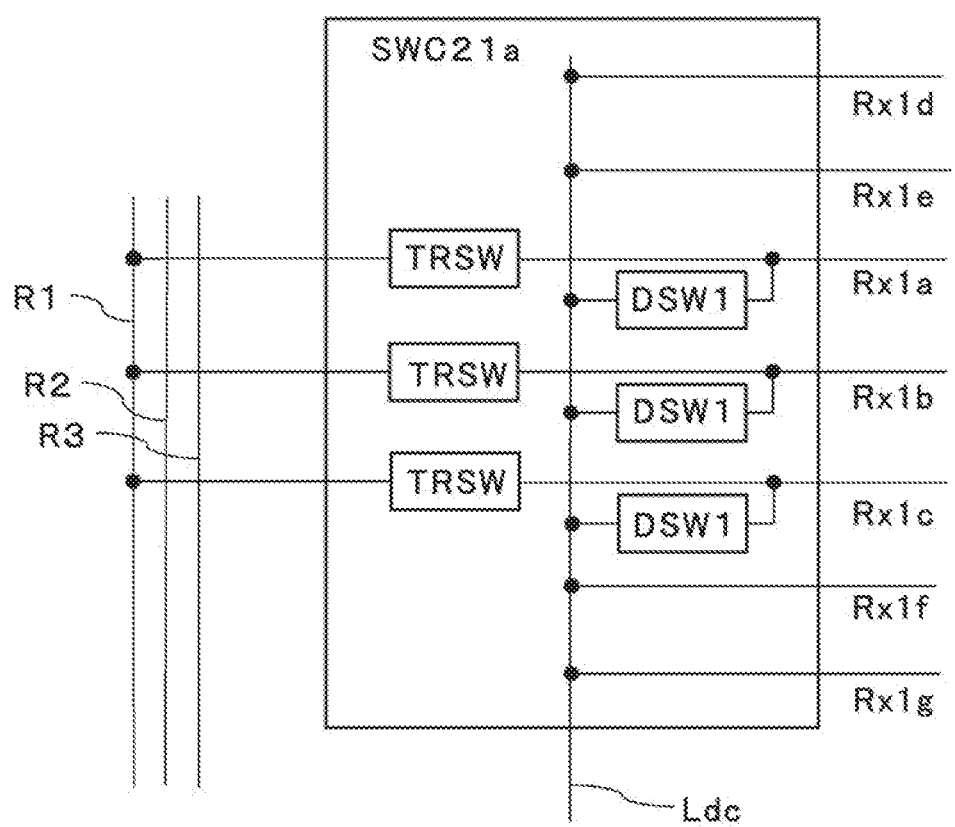
FIG. 21 is a diagram showing a configuration example of a switch circuit according to a first modification example.

FIG. 21 is a diagram showing a configuration example of a switch circuit according to a first modification example. The switch circuit SWC21$a$ shown in FIG. 21 is different from the switch circuit SWC21 shown in FIG. 9 in that the seven switch elements FSW and four switch elements DSW are deleted, and the detection electrodes Rx1$d$, Rx1$e$, Rx1$f$, and Rx1$g$ are electrically connected to the wire Ldc. Because the other constitutions and behaviors of the switch circuit SWC21$a$ are the same as those of the switch circuit SWC21, redundant descriptions will be omitted.

Therefore, the three detection electrodes Rx1$a$ to Rx1$c$, which are disposed at the touch detection nodes TN11 to TN1$m$ in the first row, that is, in the outermost portion, are configured to be used for touch detection at the time of touch detection, but not used for fingerprint detection at the time of fingerprint detection.

Figure 22:
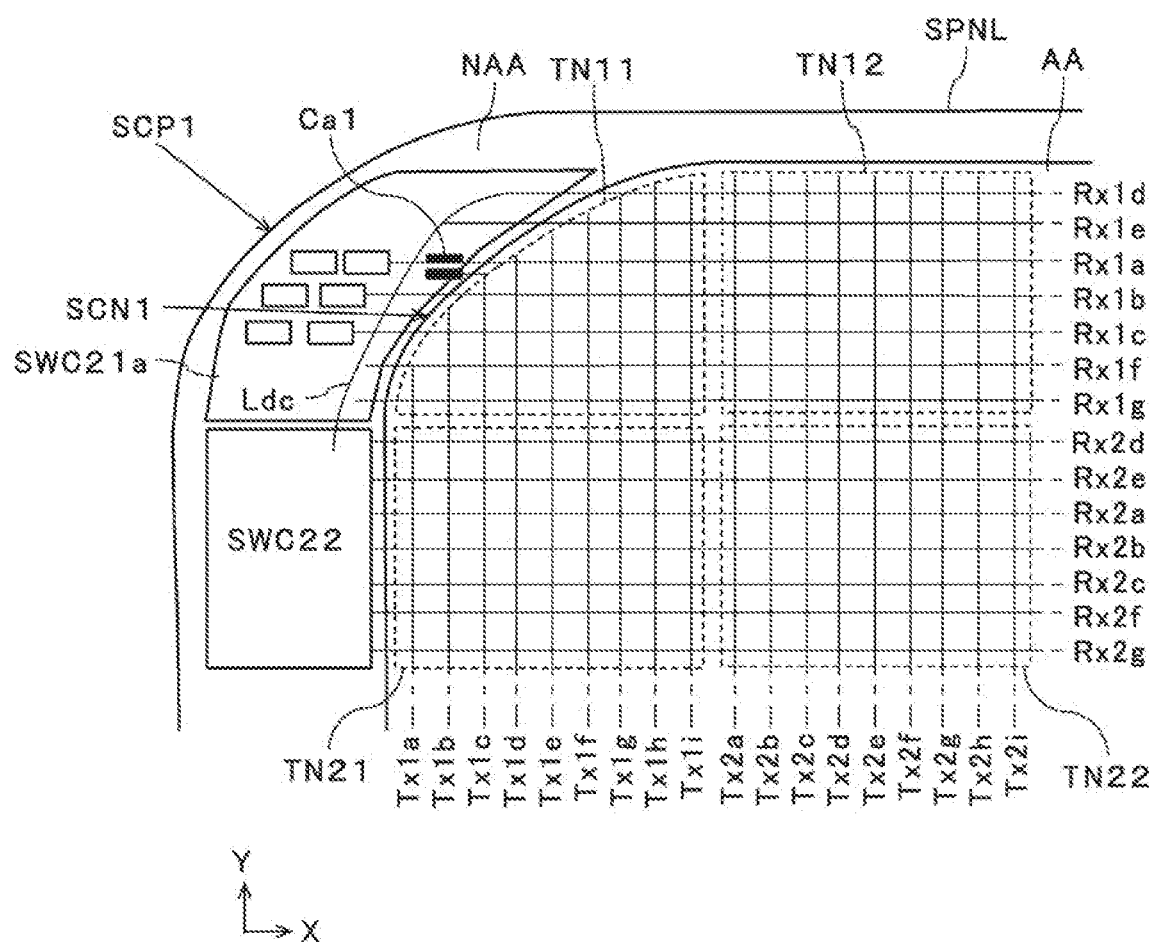
FIG. 22 is the schematically enlarged view of a corner portion according to the first modification example.

FIG. 22 is the schematically enlarged view of a corner portion according to the first modification example. FIG. 22 is different from FIG. 14 in that the seven switch elements FSW and the four switch elements DSW are deleted, and the detection electrodes Rx1$d$, Rx1$e$, Rx1$f$, and Rx1$g$ are electrically connected to the wire Ldc in the disposition region of the switch circuit SWC21$a$ in FIG. 22.

According to the first modification example, this modification example is configured in such a way that the switch circuit SWC21$a$ has comparatively larger spaces in terms of layout than the switch circuit shown SWC21 in FIG. 14. With this, the capacitance value of the auxiliary capacitor Ca1 can be set to a desired capacitance value comparatively easily. In this case, because the auxiliary capacitor Ca1 is formed in a way shown in FIG. 18, it becomes possible to install the auxiliary capacitor Ca1 with a desired capacitance value without adding a new manufacturing process.

Second Embodiment

In the first embodiment, the configuration example in which the auxiliary capacitors Ca1 to Ca4 are installed in the nonactive region NAA in the corner portions SCN1 to SCN4 of the sensor panel SPNL have been shown. In a second embodiment, a configuration example in which auxiliary capacitances are installed in the region of an active region AA of corner portions SCN1 to SCN4 will be explained. The second embodiment is configured in such a way that auxiliary wires (LA1 and LA2), which are electrically connected to a detection electrode (Rx1$a$), are extended to the active region AA, and the auxiliary capacitors are installed inside of the active region AA by using plural intersectional portions of the auxiliary wires (LA1 and LA2) and drive electrodes (Tx1$b$, Tx1$c$, Tx1$d$, Txma, Txmb, and Txmc).

Figure 23:
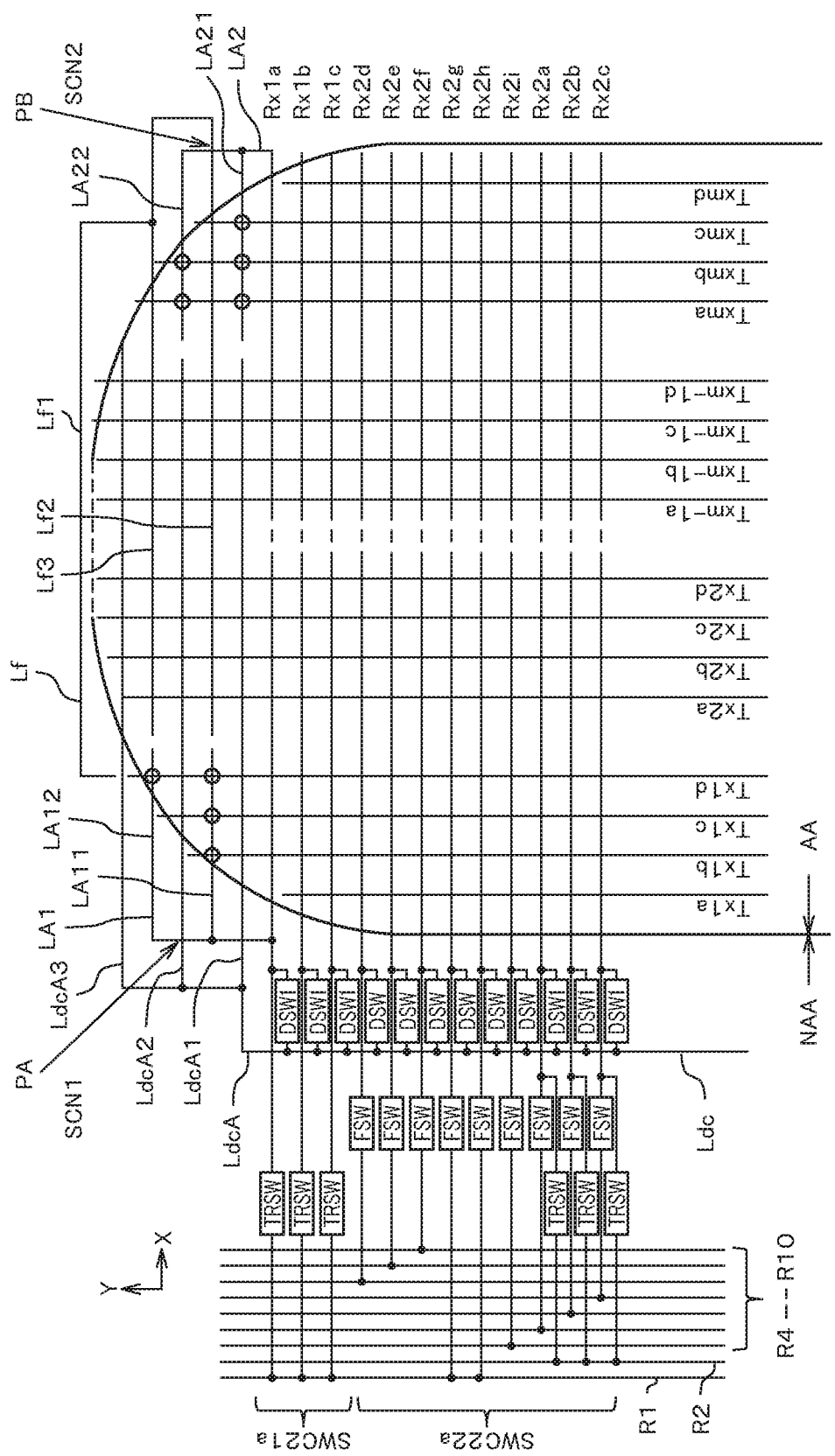
FIG. 23 is a diagram for explaining a conceptual configuration example of auxiliary capacitors according to a second embodiment.

FIG. 23 is a diagram for explaining a conceptual configuration example of the auxiliary capacitors according to the second embodiment. In FIG. 23, the configuration of a region of a sensor panel SPNL, which is corresponding to the touch detection nodes TN11 to TN1$m$ in the first row and the touch detection nodes TN21 to TN2$m$ in the second row in FIG. 12, is shown. Plural detection electrodes (Rx1$a$ to Rx1$c$, Rx2$a$ to Rx2$c$, and Rx2$d$ to Rx2$i$) are installed so as to be extended in the first direction X. M drive electrodes (Tx1$a$ to Tx1$d$, Tx2$a$ to Tx2$d$, . . . , Txm-1$a$ to Txm-1$d$, Txma to Txmd) (where M represents the number) are installed so as to be extended in the second direction Y which is perpendicular to the first direction X.

In FIG. 23, a switch circuit SWC21a and a switch circuit SWC22a are described. The detection electrodes Rx1a to Rx1c are electrically connected to the switch circuit SWC21a. The detection electrodes Rx2a to Rx2c and detection electrodes Rx2d to Rx2i are electrically connected to the switch circuit SWC22a. Furthermore, lead wires R1, R2, and R4 to R10 are formed. Although the drive electrodes (Tx1a to Tx1d, Tx2a to Tx2d, . . . , Txm-1a to Txm-1d, Txma to Txmd) are described in units of four drive electrodes in this example, it is conceivable that the drive electrodes are described in units of nine drive electrodes (Tx1a to Tx1i) as shown in the first embodiment.

Although the number of the lead wires, the number of the detection electrodes connected to the switch circuits SWC21a and SWC22a, and the disposition order of the detection electrodes in the second embodiment are different from those in the first embodiment, the behaviors of the switch circuit SWC21a and SWC22a at the time of touch detection and at the time of fingerprint detection can be easily understood by those skilled in the art from the descriptions about the switch circuits SWC21a and SWC22 in the first embodiment and the first modification example, therefore redundant descriptions will be omitted.

As shown ion FIG. 23, the first auxiliary wire LA1 and the second auxiliary wire LA2 are electrically connected to the detection electrode Rx1a. As a result, each of the first auxiliary wire LA1 and the second auxiliary wire LA2 can be regarded as the detection electrode Rx1a.

The first auxiliary wire LA1 is connected to the detection electrode Rx1a in the nonactive region NAA of the corner portion SCN1. The first auxiliary wire LA1 divides into a first sub wire LA11 and a second sub wire LA12, and the first sub wire LA11 and the second sub wire LA12 are formed so as to be extended in the first direction X.

The second auxiliary wire LA2 is connected to the detection electrode Rx1a in the nonactive region NAA of the corner portion SCN2. The second auxiliary wire LA2 divides into a first sub wire LA21 and a second sub wire LA22, and the first sub wire LA21 and the second sub wire LA22 are formed so as to be extended in the first direction X.

An additional wire LdcA is electrically connected to a wire Ldc. The additional wire LdcA is connected to the wire Ldc in the nonactive region NAA of the corner portion SCN1.

The additional wire LdcA divides into a first sub wire LdcA1, a second sub wire LdcA2, and a third sub wire LdcA3, and the first sub wire LdcA1, the second sub wire LdcA2, and the third sub wire LdcA3 are formed so as to be extended in the first direction X.

In addition, a wire Lf is formed. The wire Lf is set potentially in a floating state. The wire Lf includes a first sub wire Lf1, and a second sub wire Lf2 and a third sub wire Lf3 that branch from the first sub wire Lf1. The wire Lf, as well as the first sub wire Lf1, the second sub wire Lf2, and the third sub wire Lf3, is formed so as to be extended in the first direction X.

The first sub wire LdcA1 and the first sub wire LA21 are disposed in alignment with each other in the first direction X. The first sub wire LA11 and the second sub wire Lf2 are disposed in alignment with each other in the first direction X. The second sub wire LdcA2 and the second sub wire LA22 are disposed in alignment with each other in the first direction X. The second sub wire LA12 and the third sub wire Lf3 are disposed in alignment with each other in the first direction X.

Furthermore, the first wire LdcA1 is disposed between the detection electrode Rx1a and the first sub wire LA11. The second sub wire LdcA2 is disposed between the first sub wire LA11 and the second sub wire LA12. The second sub wire LA12 is disposed between the second sub wire LdcA2 and the third sub wire LdcA3.

In addition, the first sub wire LA21 is disposed between the detection electrode Rx1a and the second sub wire Lf2. The second sub wire LA22 is disposed between the second sub wire Lf2 and the third sub wire Lf3. The third sub wire LdcA3 is disposed between the first sub wire Lf1 and the second sub wire Lf2. The first sub wire Lf1 is disposed in the nonactive region NAA.

The first sub wire LA11 and the second sub wire LA12 are terminated between the drive electrode Tx1d and the drive electrode Tx2a. Similarly, the second sub wire Lf2 and the third sub wire Lf3 are terminated between the drive electrode Tx1d and the drive electrode Tx2a.

Furthermore, the first sub wire LA21 and the second sub wire LA22 are terminated between the drive electrode Txm-1d and the drive electrode Txma. Similarly, the first sub wire LdcA1 and the second sub wire LdcA2 are terminated between the drive electrode Txm-1d and the drive electrode Txma.

Here, the first sub wire LA11, the second sub wire LA12, the first sub wire LA21, the second sub wire LA22, the first sub wire LdcA1, the second sub wire LdcA2, the third sub wire LdcA3, the first sub wire Lf1, the second sub wire Lf2, the third sub wire Lf3, and the plural detection electrodes (Rx1a to Rx1c, Rx2a to Rx2c, and Rx2d to Rx2i) have the same wire widths and they are disposed at even intervals in a plane view. In addition, the plural drive electrodes (Tx1a to Tx1d, Tx2a to Tx2d, Txm-1a to Txm-1d, and Txma to Txmd) have the same wire widths and they are disposed at even intervals.

The relation among the lengths of the four drive electrodes Tx1a to Tx1d, which are continuously adjacent to one another, is as follows: Tx1a<Tx1b<Tx1c<Tx1d. Furthermore, any of the lengths of the four drive electrodes Tx1a to Tx1d is configured to be shorter than any of the lengths of the four drive electrodes Tx2a to Tx2d which are continuously adjacent to one another. Similarly, the relation among the lengths of the four drive electrodes Txma to Txmd, which are continuously adjacent to one another, is as follows: Txmd<Txmc<Txmb<Txma. Furthermore, any of the lengths of the four drive electrodes Txma to Txmd is configured to be shorter than any of the lengths of the four drive electrodes Txm-1a to Txm-1d which are continuously adjacent to one another.

As shown in FIG. 23, the drive electrodes Tx1b, Tx1c, and Tx1d intersect with the first sub wire LA11 and the second sub wire LA12, which are electrically connected to the detection electrode Rx1a, at four portions denoted by circles (o). In other words, auxiliary capacitors (Ca1) are formed at the four portions denoted by the circles (o).

In addition, the drive electrodes Txma, Txmb, and Txmc intersect with the first sub wire LA21 and the second sub wire LA22, which are electrically connected to the detection electrode Rx1a, at five portions denoted by circles (o). In other words, auxiliary capacitors (Ca2) are formed at the five portions denoted by the circles (o).

Therefore, the number of intersectional portions where the four drive electrodes Tx1a to Tx1d intersect with the detection electrodes Rx1a, RX1b, and Rx1c is 15 including the number of the four portions denoted by the circles (o), and the number of intersectional portions where the four drive electrodes Tx2a to Tx2d intersect with the detection electrodes Rx1a, RX1b, and Rx1c is 12. In other words, the number of intersectional portions where the four drive electrodes Tx1a to Tx1d intersect with the detection electrodes Rx1a, RX1b, and Rx1c is larger than the number of intersectional portions where the four drive electrodes Tx2a to Tx2d intersect with the detection electrodes Rx1a, RX1b, and Rx1c.

Similarly, the number of intersectional portions where the four drive electrodes Txma to Txmd intersect with the detection electrodes Rx1a, RX1b, and Rx1c is 15 including the number of the five portions denoted by the circles (o), and the number of intersectional portions where the four drive electrodes Txm-1a to Txm-1d intersect with the detection electrodes Rx1a, RX1b, and Rx1c is 12. In other words, the number of intersectional portions where the four drive electrodes Txma to Txmd intersect with the detection electrodes Rx1a, RX1b, and Rx1c is larger than the number of intersectional portions where the four drive electrodes Txm-1a to Txm-1d intersect with the detection electrodes Rx1a, RX1b, and Rx1c.

It can be considered that the sum of the areas of the intersectional portions of the four drive electrodes Tx1a to Tx1d, and the detection electrodes Rx1a, Rx1b, and Rx1c, the first sub wire LA11, and the second sub wire LA12 is substantially equal to the sum of the areas of the intersectional portions of the four drive electrodes Tx2a to Tx2d, and the detection electrodes Rx1a, Rx1b, and Rx1c in a plane view.

Similarly, it can be considered that the sum of the areas of the intersectional portions of the four drive electrodes Txma to Txmd, and the detection electrodes Rx1a, Rx1b, and Rx1c, the first sub wire LA21, and the second sub wire LA22 is substantially equal to the sum of the areas of the intersectional portions of the four drive electrodes Tx2a to Tx2d, and the detection electrodes Rx1a, Rx1b, and Rx1c in a plane view.

Here, although not shown, the configuration of the region of the sensor panel SPNL corresponding to touch detection nodes TNn1 to TNnm in the nth row and touch detection nodes TNn-11 to TNn-1m in the n−1th row in FIG. 12 is made in the upside-down state of the configuration of the first auxiliary wire LA1, the second auxiliary wire LA2, the additional wire LdcA, and the wire Lf shown in FIG. 23. Therefore, auxiliary capacitors (Ca3 and Ca4) can be formed inside of the active region AA in the corner portions SCN3 and SCN4 respectively.

In FIG. 23, as for a portion PA where the second sub wire LdcA2 and the first auxiliary wire LA1 intersect with each other, the first sub wire LA11, the second sub wire LA12, the first sub wire LdcA1, the second sub wire LdcA2, and the third sub wire LdcA3 are formed of the same second metal wire layer 206 as shown in FIG. 3. Therefore, it is preferable that the second sub wire LdcA2 corresponding to the portion PA is formed, for example, by bridge-wiring using the first metal wire layer 204. With this, it becomes possible to make the second sub wire LdcA2 and the first auxiliary wire LA1 intersect with each other three-dimensionally. In a similar way, as for a portion where the first sub wire LdcA1 and the first auxiliary wire LA1 intersect with each other, it is preferable that the first sub wire LdcA1 at the portion where the first sub wire LdcA1 and the first auxiliary wire LA1 intersect with each other is formed, for example, by bridge-wiring using the first metal wire layer 204. With this, it becomes possible to make the first sub wire LdcA1 and the first auxiliary wire LA1 intersect with each other three-dimensionally.

In a similar way, as for a portion PB where the third sub wire Lf3 and the second auxiliary wire LA2 intersect with each other, the first sub wire LA21, the second sub wire LA22, the first sub wire Lf1, the second sub wire Lf2, and the third sub wire Lf3 are formed of the same second metal wire layer 206 as shown in FIG. 3. Therefore, it is preferable that the second sub wire Lf2 corresponding to the portion PB is formed, for example, by bridge-wiring using the first metal wire layer 204. With this, it becomes possible to make the second sub wire Lf2 and the second auxiliary wire LA2 intersect with each other three-dimensionally.

According to the second embodiment, advantageous effects, which are similar to those the first embodiment brings about, can be obtained.

Next a modification example according to the second embodiment will be explained.

Second Alternation Example

Figure 24:
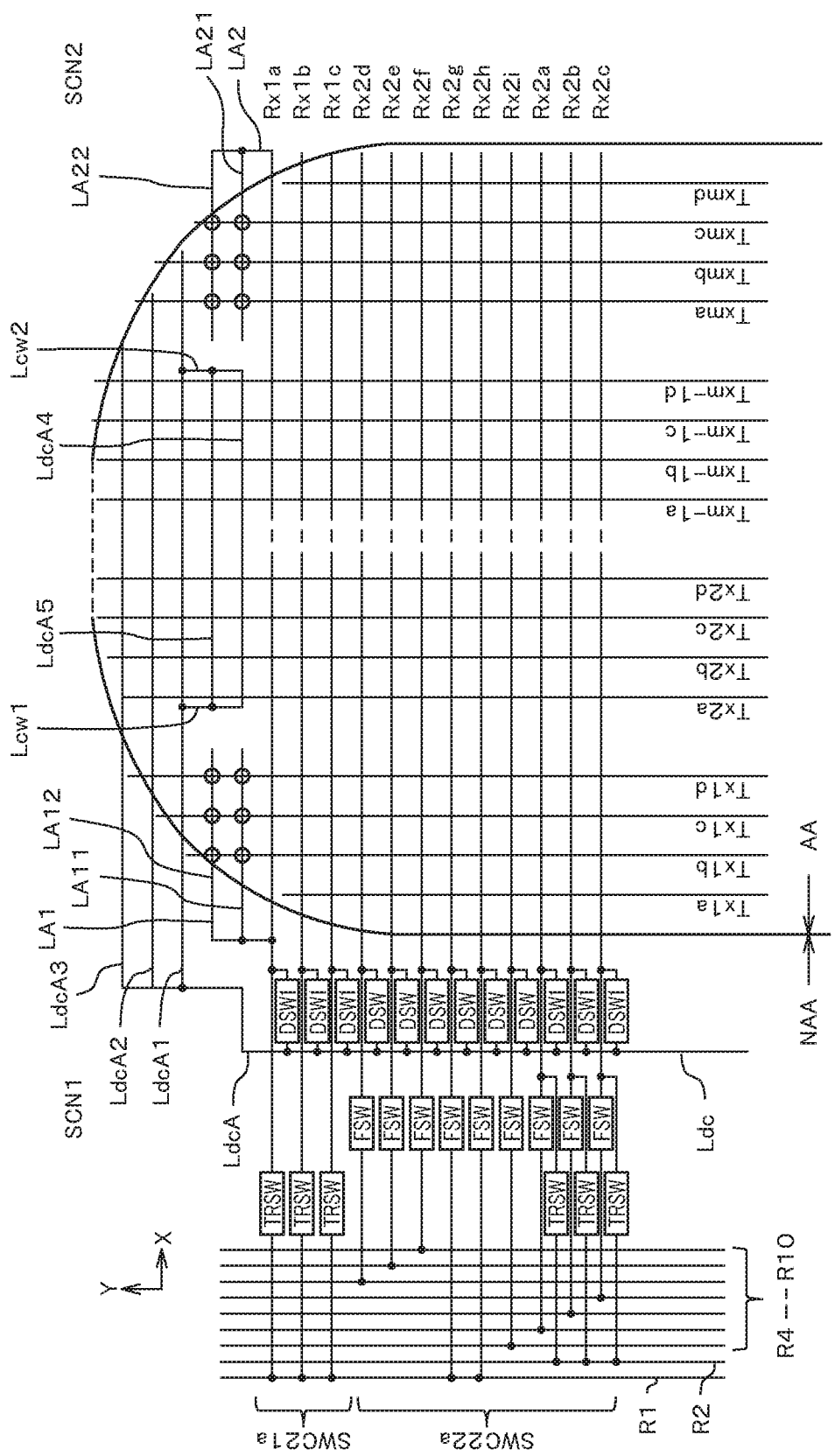
FIG. 24 is a diagram for explaining a conceptual configuration example of auxiliary capacitors according to a second modification example.

FIG. 24 is a diagram for explaining a conceptual configuration example of auxiliary capacitors according to the second modification example. FIG. 24 is different from FIG. 23 in that, in FIG. 24, the first sub wire LA11 and the second sub wire LA12 of the first auxiliary wire LA1 are adjacently disposed, the first sub wire LA21 and the second sub wire LA22 of the second auxiliary wire LA2 are adjacently disposed, and the first sub wire LdcA1, the second sub wire LdcA2, and the third sub wire LdcA3 of the additional wire LdcA are disposed so as not to intersect with the first auxiliary wire LA1 and the second auxiliary wire LA2.

The first sub wire LA11 is disposed between the detection wire Rx1a and the second sub wire LA12 in the corner portion SCN1 so as to be extended in the first direction X. The first sub wire LA21 is disposed between the detection wire Rx1a and the second sub wire LA22 in the corner portion SCN2 so as to be extended in the first direction X.

The first sub wire LdcA1, the second sub wire LdcA2, and the third sub wire LdcA3 of the additional wire LdcA are disposed so as to be extended in the first direction X. One end of the first sub wire LdcA1 is disposed so as to be adjacent to the second sub wire LA12, and the other end of the first sub wire LdcA1 is disposed so as to be adjacent to the second sub wire LA22. The second sub wire LdcA2 is disposed in the first direction X and between the first sub wire LdcA1 and the third sub wire LdcA3.

The first sub wire LdcA1 divides into a fourth sub wire LdcA4 and a fifth sub wire LdcA5. One end of the fourth sub wire LdcA4 and one end of the fifth sub wire LdcA5 are electrically connected to the first sub wire LdcA1 via a first connection wire Lcw1. The other end of the fourth sub wire LdcA4 and the other end of the fifth sub wire LdcA5 are electrically connected to the first sub wire LdcA1 via a second connection wire Lcw2.

The first connection wire Lcw1 and the second connection wire Lcw2 are formed so as to be extended in the second direction Y. Therefore, the first connection wire Lcw1 and the second connection wire Lcw2 are formed so as to run parallel to drive electrodes (for example, Tx2a and Txm-1d). The fourth sub wire LdcA4 is disposed between the first sub wire LA11 and the first sub wire LA21. The fourth sub wire LdcA4, the first sub wire LA11, and the first sub wire LA21 are disposed in alignment with one another in the first direction X. The fifth sub wire LdcA5 is disposed between the second sub wire LA12 and the second sub wire LA22.

The fifth sub wire LdcA5, the second sub wire LA21, and the second sub wire LA22 are disposed in alignment with one another in the first direction X.

With the abovementioned configuration, the drive electrodes Tx2b, Tx1c, and Tx1d intersect with the first sub wire LA11 and the second sub wire LA12, which are electrically connected to the detection electrode Rx1a, at six portions denoted by circles (o). In other words, auxiliary capacitors (Ca1) are formed at the six portions denoted by the circles (o). In addition, the drive electrodes Txma, Txmb, and Txmc intersect with the first sub wire LA21 and the second sub wire LA22, which are electrically connected to the detection electrode Rx1a, at six portions denoted by circles (o). In other words, auxiliary capacitors (Ca2) are formed at the six portions denoted by the circles (o).

According to the second modification example, advantageous effects, which are similar to those the first embodiment brings about, can be obtained. Furthermore, the first connection wire Lcw1 and the second connection wire Lcw2, which are formed in the active region AA, are formed so as to run parallel to drive electrodes (for example, Tx2a and Txm-1d). Therefore, influence on the appearance of the active region AA can be alleviated by forming the first connection wire Lcw1 and the second connection wire Lcw2 in the abovementioned way.

All kinds of display devices and touch panels that can be obtained by those skilled in the art through appropriately modifying designs based on the display devices and touch panels described above as the embodiments of the present invention fall within the scope of the present invention as long as none of the kinds of display devices and touch panels deviates from the gist of the present invention.

It should be understood that, if various modification examples and modification examples are easily conceived by those skilled in the art in the idea of the present invention, those modification examples and modification examples also fall within the scope of the present invention. For example, devices obtained in the case where those skilled in the art appropriately add components to the above-described various embodiments, delete components from the above-described various embodiments, add processes to original processes for the above-described various embodiments, omit processes from the original processes, or modify conditions for implementing the above-described various embodiments fall within the scope of the present invention as long as the devices do not deviate from the gist of the present invention.

In addition, it should be obviously understood that other operational effects, which are brought about by the above-described embodiments, clear from the descriptions of the present specification, and can be accordingly conceived by those skilled in the art, are brought about the present invention.

Various inventions can be achieved by appropriately combining plural components disclosed in the above-described embodiments. For example, a new invention will be achieved by deleting some components from all the components included in one of the above-described embodiments. Alternatively, another new invention will be achieved by appropriately combining components from the above-described embodiments.

What is claimed is:

1. A display device comprising:
   a display panel;
   a sensor substrate formed on the display panel; and
   a plurality of drive electrodes and a plurality of detection electrodes extended in a direction so as to intersect with the plurality of drive electrodes on the sensor substrate,
   wherein among the plurality of drive electrodes, any of the lengths of N first drive electrodes (where N represents the number), which are continuously adjacent to one another, is shorter than any of the lengths of the other drive electrodes, and
   an area where at least one drive electrode among the N first drive electrodes and at least one detection electrode overlap each other is larger than the area of an intersectional portion where any of the other drive electrodes and any of the other detection electrodes overlap each other.

2. The display device according to claim 1,
   wherein the plurality of drive electrodes additionally include N second drive electrodes (where N represents the number) which are continuously adjacent to one another,
   the plurality of detection electrodes include L detection electrodes (where L represents the number) which are continuously adjacent to one another, and
   the sum of the areas of intersectional portions of the N first drive electrodes and the L detection electrodes is substantially equal to the sum of the areas of intersectional portions of the N second drive electrodes and the L detection electrodes.

3. The display device according to claim 2,
   wherein at the time of touch detection,
      the plurality of drive electrodes are sequentially used for executing drive operations in units of at least N drive electrodes (where N represents the number), and
      the plurality detection electrodes are used for executing detection operations in units of L detection electrodes (where L represents the number); and
   at the time of fingerprint detection,
      the plurality of drive electrodes are sequentially used for executing drive operations one by one, and
      the plurality detection electrodes are used for executing detection operations in units of at least L detection electrodes (where L represents the number).

4. The display device according to claim 3, wherein, at the time of the fingerprint detection, the L detection electrodes (where L represents the number) residing in the outermost portion are not used for executing detection operations.

5. The display device according to claim 1, wherein a large site, where the area of a portion where the at least one drive electrode and the at least one detection electrode overlap each other is large, resides in the outer part of the display region of the display panel.

6. The display device according to claim 5, wherein the large site resides in a corner portion of the display region.

7. A touch panel comprising:
   a sensor substrate; and
   a plurality of drive electrodes and a plurality of detection electrodes extended in a direction so as to intersect with the plurality of drive electrodes on the sensor substrate,
   wherein among the plurality of drive electrodes, any of the lengths of N first drive electrodes (where N represents the number), which are continuously adjacent to one another, is shorter than any of the lengths of the other drive electrodes, and
   an area where at least one drive electrode among the N first drive electrodes and at least one detection electrode overlap each other is larger than the area of an intersectional portion where any other drive electrode and any other detection electrode overlap each other.

8. The touch panel according to claim 7, wherein the plurality of drive electrodes additionally include N second drive electrodes (where N represents the number) which are continuously adjacent to one another, the plurality of detection electrodes include L detection electrodes (where L represents the number) which are continuously adjacent to one another, and the sum of the areas of the intersectional portions of the N first drive electrodes and the L detection electrodes is substantially equal to the sum of the areas of the intersectional portions of the N second drive electrodes and the L detection electrodes.

9. The touch panel according to claim 8, wherein at the time of touch detection, the plurality of drive electrodes are sequentially used for executing drive operations in units of N drive electrodes (where N represents the number), and the plurality detection electrodes are used for executing detection operations in units of L detection electrodes (where L represents the number); and at the time of fingerprint detection, the plurality of drive electrodes are sequentially used for executing drive operations one by one, and the plurality detection electrodes are used for executing detection operations in units of at least L detection electrodes (where L represents the number).

10. The touch panel according to claim 9, wherein, at the time of the fingerprint detection, the L detection electrodes (where L represents the number) residing in the outermost portion are not used for executing detection operations.

11. The touch panel according to claim 7, wherein a large site, where the area of a portion where the at least one drive electrode and the at least one detection electrode overlap each other is large, resides in the outer part of a sensor-active region.

12. The touch panel according to claim 11, wherein the large site resides in a corner portion of the sensor-active region.

* * * * *